US011218449B2

(12) United States Patent
Asveren et al.

(10) Patent No.: US 11,218,449 B2
(45) Date of Patent: *Jan. 4, 2022

(54) COMMUNICATIONS METHODS, SYSTEMS AND APPARATUS FOR PACKET POLICING

(71) Applicant: Ribbon Communications Operating Company, Inc., Westford, MA (US)

(72) Inventors: Tolga Asveren, Bordentown, NJ (US); Amol Sudhir Gogate, Pune (IN); Subhransu S. Nayak, Acton, MA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,948

(22) Filed: May 1, 2020

(65) Prior Publication Data

US 2020/0259794 A1    Aug. 13, 2020

Related U.S. Application Data

(63) Continuation of application No. 15/959,933, filed on Apr. 23, 2018, now Pat. No. 10,742,608.

(30) Foreign Application Priority Data

Mar. 8, 2018 (IN) .............................. 201841008526

(51) Int. Cl.
*H04L 29/06* (2006.01)
*H04L 12/813* (2013.01)
*H04L 12/819* (2013.01)

(52) U.S. Cl.
CPC .......... *H04L 63/0263* (2013.01); *H04L 47/20* (2013.01); *H04L 47/215* (2013.01); *H04L 63/0236* (2013.01); *H04L 63/1458* (2013.01); *H04L 2463/141* (2013.01)

(58) Field of Classification Search
CPC ............. H04L 63/0263; H04L 63/1458; H04L 2463/141; H04L 47/215; H04L 47/20
See application file for complete search history.

(56) References Cited

U.S. PATENT DOCUMENTS

| 9,088,508 | B1 * | 7/2015 | Caputo, II | .............. H04L 43/18 |
| 9,154,460 | B1 * | 10/2015 | Bharrat | ............... H04L 63/0245 |
| 2004/0083385 | A1 * | 4/2004 | Ahmed | ............... H04L 63/1441 726/22 |

(Continued)

*Primary Examiner* — Ashokkumar B Patel
*Assistant Examiner* — William B Jones
(74) *Attorney, Agent, or Firm* — Straub & Straub; Stephen T. Straub; Michael P. Straub

(57) ABSTRACT

The present invention relates to methods, systems and apparatus for providing efficient packet flow fillrate adjustments and providing protection against distributed denial of service attacks. One exemplary embodiment in accordance with the invention is a method of operating a communication system including the steps of receiving, at a session border controller, a first SIP invite request message; making a decision, at the session border controller, as to whether the first SIP invite request originated from an Integrated Access Device or an IP-PBX device; generating, at the SBC, a packet flow fillrate based on said decision as to whether the SIP invite request originated at an Integrated Access Device or an Internet Protocol-Private Branch Exchange (IP-PBX) device.

20 Claims, 24 Drawing Sheets

(56) References Cited

U.S. PATENT DOCUMENTS

| | | | |
|---|---|---|---|
| 2005/0083845 A1* | 4/2005 | Compton | H04L 47/2408 370/235 |
| 2009/0232015 A1* | 9/2009 | Domschitz | H04L 47/824 370/252 |
| 2014/0119180 A1* | 5/2014 | Adams | H04L 47/20 370/230 |
| 2014/0126427 A1* | 5/2014 | Elizarov | H04L 65/1053 370/259 |

\* cited by examiner

800 → PSEUDOCODE FOR PROVIDING EFFICIENT PACKET FLOW FILLRATE ADJUSTMENT AND (D)DOS PROTECTION

```
1000   Initial INVITE received for AoR-1
1010   IF there is no context for AoR-1
1020         Create context for AoR-1
1030         Create uflow for IP/port upon receipt of 401/407  /* fillrate=0, to
1040   accommodate subsequent INVITE with credentials */
1050         Update uflow fillrate with current_rate upon receipt of 200 for subsequent
1060   INVITE with credentials
1070   ELSE /* there is already context for AoR-1 */
1080         If (received IP/port != context IP/port)
1090               IF (multiple context for the same AoR allowed)
1100                     Create new context /*or maintain a list of IP/port pairs in the
1110   same context */
1120                     Create new uflow
1130               ELSE
1140                     Update context with the new IP/port /* existing IP/port is
1145   still kept */
1150                     Create new uflow
1160                     Delete old uflow and the existing IP/port after the
1165   new context is successfully authenticated -if at all- 1170   IF (Error Response received for INVITE)
1180         Find corresponding context based on AoR
1190         Delete uflow
1200         Delete context 1210   uflow fillrate determination
1220         IF (total uflows on this IP == 0)
1230               /* This is the first uflow */
1240               current fillrate = IP-PBX rate based on CAC
1250         ELSE
1260               IF (total uflows on this IP < IAD threshold) /* IAD_threshold is
1270   used to distinguish between IAD/IP-PBX scenarios */
1280                     /* IP-PBX scenario */
1290                     current fillrate = current fillrate / total uflows
1300                     update existing uflows with current fillrate
1310                     use current fillrate for the new uflow
1320               ELSE IF (total uflows on this IP  == IAD threshold
1330                     /* IAD Scenario - IAD threshold reached for the first time */
1340                           current fillrate = IAD rate based on CAC
1350                           update existing uflows with current fillrate
1360                           use current fillrate for the new uflow
1370                     ELSE /* total uflows already more than IAD threshold */
1375                           use current fillrate for the new uflow
```

| FIGURE 8A |
|-----------|
| FIGURE 8B |

1380  IP-PBX rate based on CAC = (CAC rate) * (average number of messages per call) *
1390  (average number of octets per call) * (cushion factor)

1400  IAD rate based on CAC = [ (CAC rate) * (average number of messages per call) *
1410  (average number of octets per call) * (cushion factor) ] / (maximum expected
1420  number of IADs)

1430  IP-PBX rate adjustment based on CAC and current number of AoRs = (current
1440  number of AORs on IP/port) * [ (CAC rate) * (average number of messages per call)
1450  * (average number of octets per call) * (cushion factor) ] / (total number of current
1460  AoRs on IP)

1470  IP-PBX Rate Adjustment
1480      Upon timer expiry
1490          For each IP-PBX port /* each IP/port pair */
1500              IP-PBX rate = IP-PBX rate adjustment based on CAC and
1500  current number of AoRs
1510              Start timer 1520  Keep NAT bindings open
1530      For all AoR contexts
1540          Send SIP OPTIONS based on a configured timer /* ICMP ping,
1550  STUN connectivity checks etc... may alternatively be used to keep NAT bindings
1560  open */
1570              IF 200(OPTIONS) received
1580                  Do nothing
1590              ELSE
1600                  Delete the uflow
1610                  Delete the context

FIGURE 8B

| FIGURE 10A |
| FIGURE 10B |
| FIGURE 10C |
| FIGURE 10D |
| FIGURE 10E |
| FIGURE 10F |
| FIGURE 10G |
| FIGURE 10H |
| FIGURE 10I |

| FIGURE 11A |
| FIGURE 11B |
| FIGURE 11C |

COMMUNICATIONS METHODS, SYSTEMS AND APPARATUS FOR PACKET POLICING

RELATED APPLICATIONS

The present application is a continuation of U.S. patent application Ser. No. 15/959,933 filed on Apr. 23, 2018 which was published on Sep. 12, 2019 as U.S. Patent Application Publication Number US 2019-0281021 A1 and which claims the benefit of the filing date of Indian Provisional Patent Application S.N. 201841008526 filed on Mar. 8, 2018. Each of the aforementioned applications and publications are hereby expressly incorporated by reference in their entirety.

FIELD OF INVENTION

The present invention relates to communications methods, systems and apparatus for protecting against attacks such as for example denial of service (DOS) attacks. The present invention further relates to communications methods, systems and apparatus for protecting against distributed denial of service ((D)DOS) attacks in Session Initiation Protocol access deployments where public Internet Protocol (IP) addresses which are used by Integrated Access Devices (IADs) and/or Internet Protocol Private Branch Exchanges (IP-PBXs) are not known a priori. The present invention further relates to providing distributed denial of service Internet Protocol packet level protection to first hop core network elements, such as for example Access Session Border Controllers. The present invention further relates to providing efficient fillrate adjustments for Distributed Denial of Service Attack protection and minimizes over allocation of bandwidth.

BACKGROUND

Denial of Service attacks occur when an attacker attempts to make a service provided by a service provider unavailable for example by crashing the computer or network server(s) providing the service or by flooding the computer or network server(s) used to provide the service with requests.

In a distributed denial of service (DDoS) attack the attacker uses a number of different unique IP addresses typically in the thousands or tens of thousands. Ingress filtering becomes ineffective to stop the attack because the incoming traffic, e.g., requests for service are originating (or appear to be originated) from many different sources. In addition, in some attacks the attacker uses IP address spoofing which occurs when the attacker forges the IP sender addresses included in the traffic flow further complicating identifying distributed denial of service attack packets from legitimate attack packets.

In communication networks which support Session Initiation Protocol (SIP), user equipment devices (UEs) typically register with the network before they can place or receive calls. During registration a user device sends a registration request to a registration entity that registers the user device with the network. However, there are certain SIP access deployments in which public IP addresses used by Integrated Access Devices and/or Internet Protocol Private Branch Exchanges (IP-PBXs) are not know a priori. Furthermore, some of those deployments do not use SIP registration and some again may be operating behind a Network Address Translation (NAT) or Network Address and Port Translation (NAPT) device. In cases where one or more network address translation (NAT) or NAPT devices are used, with multiple instances behind the same NAT device, the source IP Address/port pair of an INVITE packet is not reliable for use in determining the correct instance placing the call. For example in some cases all SIP INVITE requests from all instances behind the same NAT or NAPT device use the same public IP Address and port information for INVITE. In such deployments, authentication is provided by the Registrar and/or Application Server challenging the SIP INVITE requests requiring the originator of the request to provide the correct response before service will be provided.

As a result, access network elements such as access Session Border Controllers that receive SIP INVITE requests in SIP INVITE authenticated deployments from unknown IP addresses are susceptible to distributed denial of service attacks as they cannot in advance determine which packets with public IP addresses are legitimate, e.g., from public IP addresses used by Integrated Access Device(s) or IP-PBXs, and which are DDOS attack packets. Furthermore, in cases in which a device behind the NAT is controlled by a malicious entity/attacker that passes the authentication test, the device controlled by the malicious entity/attacker will be able to flood the SBC and the application server.

From the above discussion, it should be appreciated that there is a need for new and/or improved communications methods, systems and apparatus for improving the protection and resilience of communications systems and apparatus against attacks such as DDOS attacks. Furthermore, there is a need new and/or improved communications methods, systems and apparatus that mitigate the effects of DDOS attacks. Additionally there is a need for new and/or improved communications methods, systems, and apparatus that provide distributed denial of service Internet Protocol packet level protection of first hop core network elements, e.g., Access Session Border Controllers, that support Integrated Access Device(s) and/or IP-PBXs operating behind NAT and/or NAT devices. Moreover, there is a need for new and/or improved methods, systems and apparatus for providing distributed denial of service attack protection for SIP INVITE authenticated deployments from unknown IP addresses.

SUMMARY

The present invention is directed to various features relating to communications methods, systems and apparatus for protecting against and mitigating the effect of attacks such as Distributed Denial of Service attacks. Various embodiments of the present invention, address one or more of the problems described above.

In an exemplary communications method embodiment of the present invention, the method comprising the steps of receiving, at a session border controller, a first SIP invite request message; making a decision, at the session border controller, as to whether the first SIP INVITE request message originated from a user device coupled to the session border controller via an Integrated Access Device or via an IP-PBX device; and generating, at the SBC, a packet flow fillrate based on said decision as to whether the SIP invite request message originated from said user device coupled to the session border controller via the Integrated Access Device (IAD) or the Internet Protocol-Private Branch Exchange (IP-PBX) device.

In some embodiments, the communications method further includes the step of implementing packet flow restrictions using the generated packet flow fillrate.

In some embodiments of the present invention the step of generating a packet flow fillrate includes: generating an IP-PBX packet flow fillrate for the source Internet Protocol address included in the SIP INVITE request message when the decision is that the first SIP INVITE request message originated from the user device coupled to the session border controller via the IP-PBX device; and generating an IAD packet flow fillrate for the source Internet Protocol address when the decision is that the first SIP INVITE request message originated from the user device coupled to the session border controller via the IAD device. In method may also include updating, at the session border controller, the generated packet flow fillrate on a periodic basis.

In some embodiments, the method also includes prior to making said decision determining from the first SIP INVITE request message the source IP address included in the first SIP INVITE request message, determining a total number of microflows with the determined source IP address currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source IP address currently active at the session border controller.

In some embodiments the step of making said decision further includes determining that said SIP INVITE request message originated from the user device coupled to the session border controller via the IP-PBX if said total number of microflows with the determined source IP address currently active at the session border controller is less than an Integrated Access Device threshold value.

In some embodiments, the session border controller implements a token bucket policer with a fillrate of zero to implement packet flow restrictions of packets including a source Internet Protocol address and port number pair matching the source Internet Protocol address and port number pair included in said first SIP INVITE request message until said first SIP INVITE request message has been successfully authenticated. In some, but not all embodiments, the IAD packet flow fillrate is generated based on one or more of the following items: call admission control rate, an average number of messages per call, an average number of octets per call, a reserve factor, and a maximum number of Integrated Access Devices.

In various embodiments, the IP-PBX packet flow fillrate is generated based on one or more of the following items: call admission control rate, an average number of messages per call, an average number of octets per call, a reserve factor and said total number of microflows having the source IP address.

In some, but not all embodiments, the method further includes prior to making said decision determining from the first SIP INVITE request message the source public IP subnet mask of the first communications device included in the first SIP INVITE request message, said first communications device being a Network Address Translation device, determining a total number of microflows with the determined source public IP subnet mask currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source public IP subnet mask currently active at the session border controller.

The present invention also applicable to apparatus and systems which implement the various steps of the method embodiments.

In an exemplary apparatus embodiment, a session border controller comprises a processor that controls the session border control to perform the following operations: receive a first SIP invite request message; make a decision as to whether the first SIP INVITE request message originated from a user device coupled to the session border controller via an Integrated Access Device or via an IP-PBX device; generate a packet flow fillrate based on said decision as to whether the SIP invite request message originated from said user device coupled to the session border controller via the Integrated Access Device (IAD) or the Internet Protocol-Private Branch Exchange (IP-PBX) device. In another embodiment, the processor is further controls the session border controller to implement packet flow restrictions using the generated packet flow fillrate. In some embodiments, generating a packet flow fillrate includes: generating an IP-PBX packet flow fillrate for the source Internet Protocol address included in the SIP INVITE request message when the decision is that the first SIP INVITE request message originated from the user device coupled to the session border controller via the IP-PBX device; and generating an IAD packet flow fillrate for the source Internet Protocol address when the decision is that the first SIP INVITE request message originated from the user device coupled to the session border controller via the IAD device.

In some embodiments the processor of the session border controller further controls the session border controller to update the generated packet flow fillrate on a periodic basis. In various embodiments, the processor of the session border controller further controls the session border controller to: prior to making said decision determine from the first SIP INVITE request message the source IP address included in the first SIP INVITE request message, determine a total number of microflows with the determined source IP address currently active at the session border controller; and wherein said making a decision as to whether the SIP INVITE request message originated from the user device coupled to the session border controller via the Integrated Access Device or the IP-PBX device includes making said decision based on said total number of microflows with the determined source IP address currently active at the session border controller.

In some embodiments, making said decision further includes determining that said SIP INVITE request message originated from the user device coupled to the session border controller via the IP-PBX if said total number of microflows with the determined source IP address currently active at the session border controller is less than an Integrated Access Device threshold value.

In various embodiments, the session border controller implements a token bucket policer with a fillrate of zero to implement packet flow restrictions of packets including a source Internet Protocol address and port number pair matching the source Internet Protocol address and port number pair included in said first SIP INVITE request message until said first SIP INVITE request message has been successfully authenticated.

In some, but not all embodiments, the IAD packet flow fillrate is generated based on one or more of the following items: call admission control rate, an average number of messages per call, an average number of octets per call, a reserve factor, and a maximum number of Integrated Access Devices.

In some embodiments, the IP-PBX packet flow fillrate is generated based on one or more of the following items: call admission control rate, an average number of messages per call, an average number of octets per call, a reserve factor and said total number of microflows having the source IP address.

In some embodiments, the session border controller processor further controls the session border controller to: prior to making said decision determine from the first SIP INVITE request message the source public IP subnet mask of the first communications device included in the first SIP INVITE request message, said first communications device being a Network Address Translation device, determine a total number of microflows with the determined source public IP subnet mask currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source public IP subnet mask currently active at the session border controller.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 8 illustrates the combination of FIGS. 8A and 8B.

FIG. 8A illustrates the first part of pseudocode of an exemplary communications method in accordance with one embodiment of the present invention.

FIG. 8B illustrates the second part of pseudocode of an exemplary communications method in accordance with one embodiment of the present invention.

DETAILED DESCRIPTION

Figure 1:
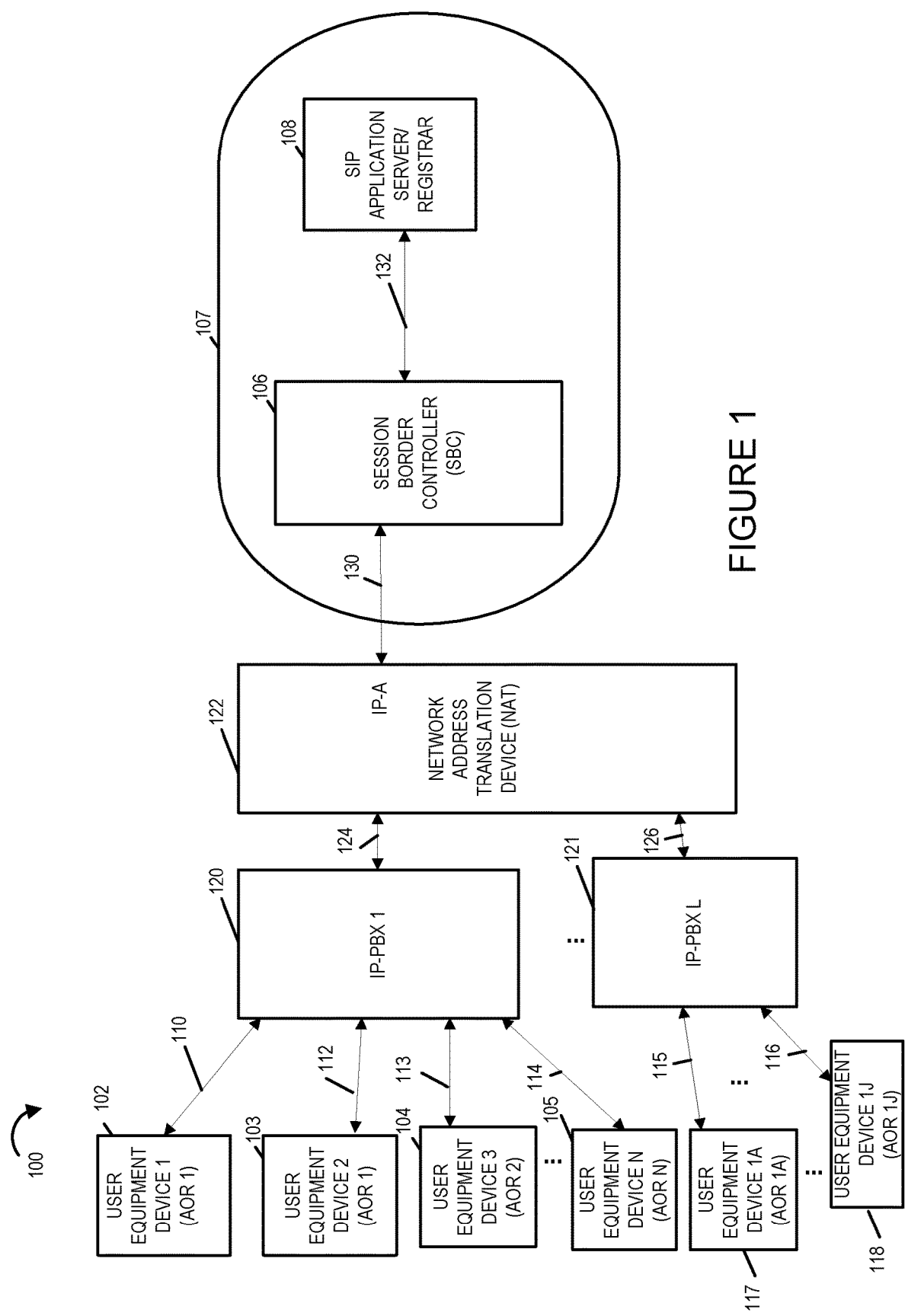
FIG. 1 illustrates an exemplary communications system in accordance with one embodiment of the present invention.

FIG. 1 illustrates an exemplary system 100 in accordance with an exemplary embodiment. System 100 includes a plurality of user equipment (UE) devices, a plurality of Internet Protocol-Private Branch Exchange systems, a Network Address Translation (NAT) device 122, a network 107 with network elements including a session border controller (SBC) 106 and an Session Initiation Protocol (SIP) application server 108. The SIP application server 108 provides SIP application services as well as registration services (e.g., authentication of user devices before providing requested services). The SIP application server 108 is sometimes a SIP Registrar. The Network Address Translation device may be, and in some embodiments is, a Network Address and Port Translation (NAPT) device. The term NAT device will be used in the specification to refer to network address translation devices that perform either IP address translation or IP address and port translation. The plurality of user equipment (UE) devices include user equipment device 1 (UE 1) 102, user equipment device 2 (UE 2) 103, user equipment device 3 (UE 2) 104, . . . , user equipment device N (UE N) 105 where N is a positive integer number greater than 3 as well as user equipment devices 1A 117, . . . , user equipment device 1J 118 where J is a positive integer number. Each user equipments device may be e.g., a mobile or stationary communications device, such as a cellular phone, fixed wired phone, smartphone, tablet device, laptop computer or other communications device and typically supports among other communications methods SIP signaling and is capable of communicating over an IP network. In various embodiments various user devices such as the ones shown in FIG. 1 include a SIP user agent. The UE devices UE 1 102, UE 2 103, . . . , and UE N 105 are coupled to the IP-PBX 120 via communication links 110, 112, 113 and 114 respectively.

The plurality of IP-PBX devices include IP-PBX 1 device 120, . . . , IP-PBX L device 121 where L is a positive integer number. While a plurality of IP-PBX devices are shown the invention is also applicable to a single IP-PBX device.

In various embodiments the UE devices 102, 103, 104, . . . , and the IP-PBX 1 device 120 communicate and exchange information over a communications network formed by the communications links 110, 112, 113, . . . , 114. The IP-PBX 120 is coupled over communications link 124 to NAT device 122. The UE devices 117, . . . , 118 are coupled to IP-PBX device 2 121 over communications links 115, . . . , 117. The IP-PBX device 2 121 is coupled to the NAT device 122 via communications link 126. The NAT device 122 is coupled SBC 106 of network 107 via communication link 130. The SBC 106 is coupled to the SIP Application Server/Registrar 108 via communications link 132. The NAT device 122 is shown as having a public Internet Protocol Address IP-A which is used for communicating with the SBC. The NAT device 122 may, and in some embodiments does, have multiple public IP addresses it uses for communicating with the SBC 106.

In some embodiments the exemplary session border controller (SBC) 106 and the SIP registration server 108 are located at an operator/service provider's site. In various embodiments the UE devices in the system 100 establish TCP (Transmission Control Protocol) or UDP (User Datagram Protocol) connections for communicating with the SBC 106 and the SIP application server 108 via the IP-PBX systems 120, 121 and NAT device 122. In some embodiments, one or more of the communications links of the system 100 are a plurality of multiple communications links and/or support a plurality of communications channels.

Figure 2:
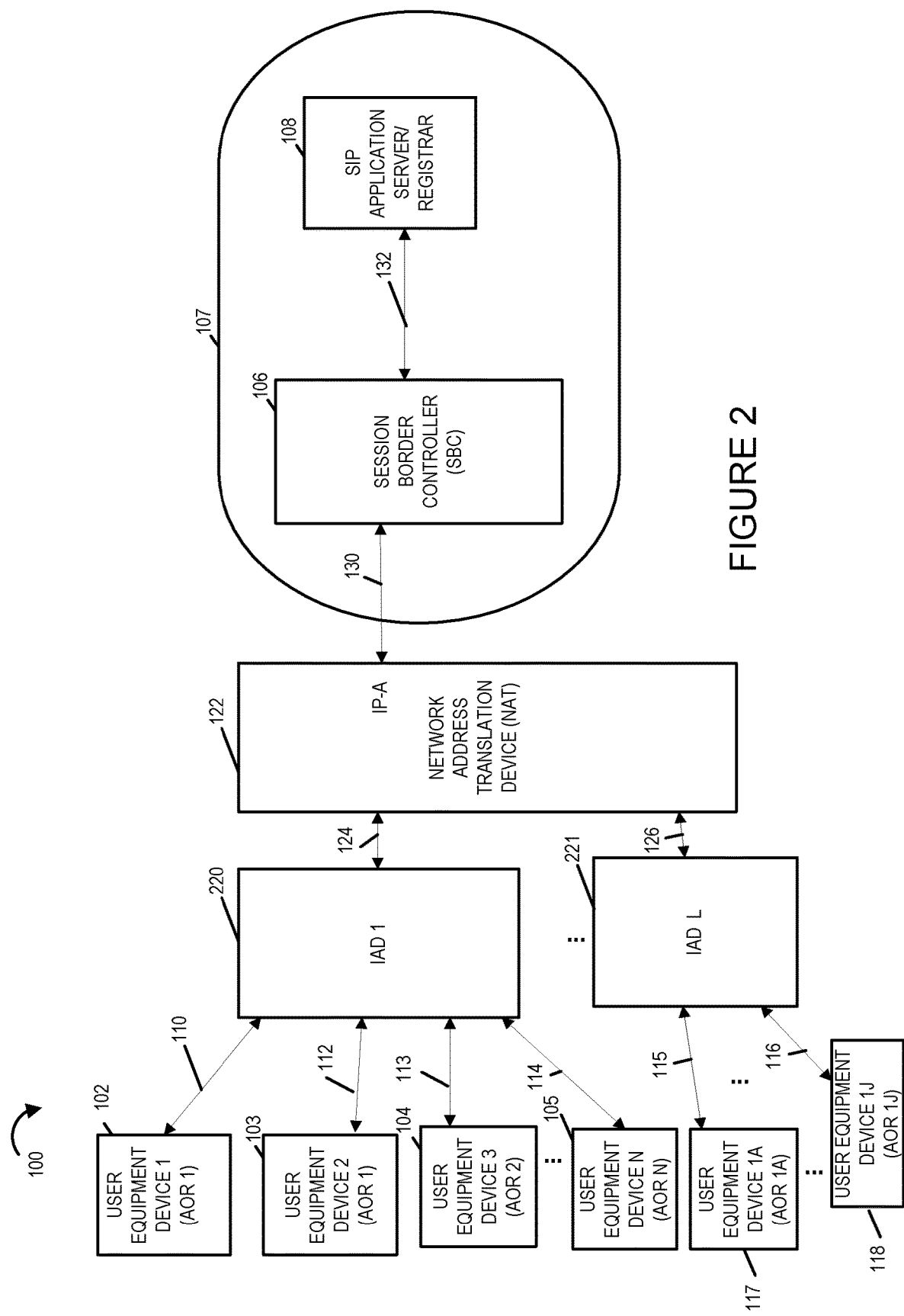
FIG. 2 illustrates another exemplary communications system in accordance with a second embodiment of the present invention.

FIG. 2 illustrates a second exemplary system embodiment 200 of the present invention. Elements or steps with the same reference numbers used in different figures are the same or similar and those elements or steps will not be described in detail again. In the second exemplary embodiment Integrated Access Devices (IADs) have replaced the IP-PBXes. An Integrated Access Device (or IAD) is a customer premises device that provides access to wide area networks and the Internet by aggregating multiple channels of information including voice and data across a single shared access link typically to a carrier or service provider PoP (Point of Presence). The access link may be and in some embodiments is for example, a T1 line, a DSL connection, a cable (CATV) network, a broadband wireless link, or a metro-Ethernet connection. In the system 200 the IAD-1, . . . , IAD-L where L is a positive integer number. The user equipment devices 102, 103, 104, . . . , 105 being coupled to the IAD 1 220 via communications links 110, 112, 113, . . . , 114 and the user equipment devices 117, . . . , 118 being coupled to the IAD 2 L 221 via communications links 115, . . . , 116. The IAD 1 220 being coupled to the NAT 122 via communication link 124 and the IAD L 221 being coupled to the NAT device 122 via communications link 126. In some embodiments the user equipment devices, IP-PBX system, NAT device, SBC and SIP application server are all hardware devices including one or more processors, memory and software control instructions which when executed by said one or more processors control and/or hardware circuits, e.g., hardware receivers and transmitters. The software instructions when executed by the one or more processors of the devices control the devices to operate and perform the steps of the methods described herein.

In some system embodiments, instead of a single NAT device 122, a plurality of NAT devices are used which are positioned between the IP-PBX(es) or IAD(s) and the SBC with SIP messages from the IP-PBX(es) passing through the network address translation device before reaching the SBC. The NAT device 122 may and in some embodiments uses private IP addresses facing the IP-PBX(es) while using one or more public IP addresses facing the SBC.

System 100 and 200 of FIGS. 1 and 2 include embodiments in which authentication is provided for UE devices and/or IAD(s) and/or IP-PBX(es) through challenging the SIP INVITE requests by the SIP application server as opposed to registering with the SIP application server/registrar 108 prior to sending a SIP INVITE request. In some system embodiments, the NAT device 122 illustrated in system 100 and 200 of FIGS. 1 and 2 is not used however the IP addresses of the IP-PBX(es) and IADs are public IP addresses which are not known by the SBC and/or the SIP application server 108 apriori. In embodiments which utilize the NAT device 122, the public IP address(es) of the NAT device will hide the sender IP address as it will have been translated by the NAT device and hence the source IP address of the SIP INVITE request will also not be known by the SBC and/or the SIP application server apriori.

Figure 3:
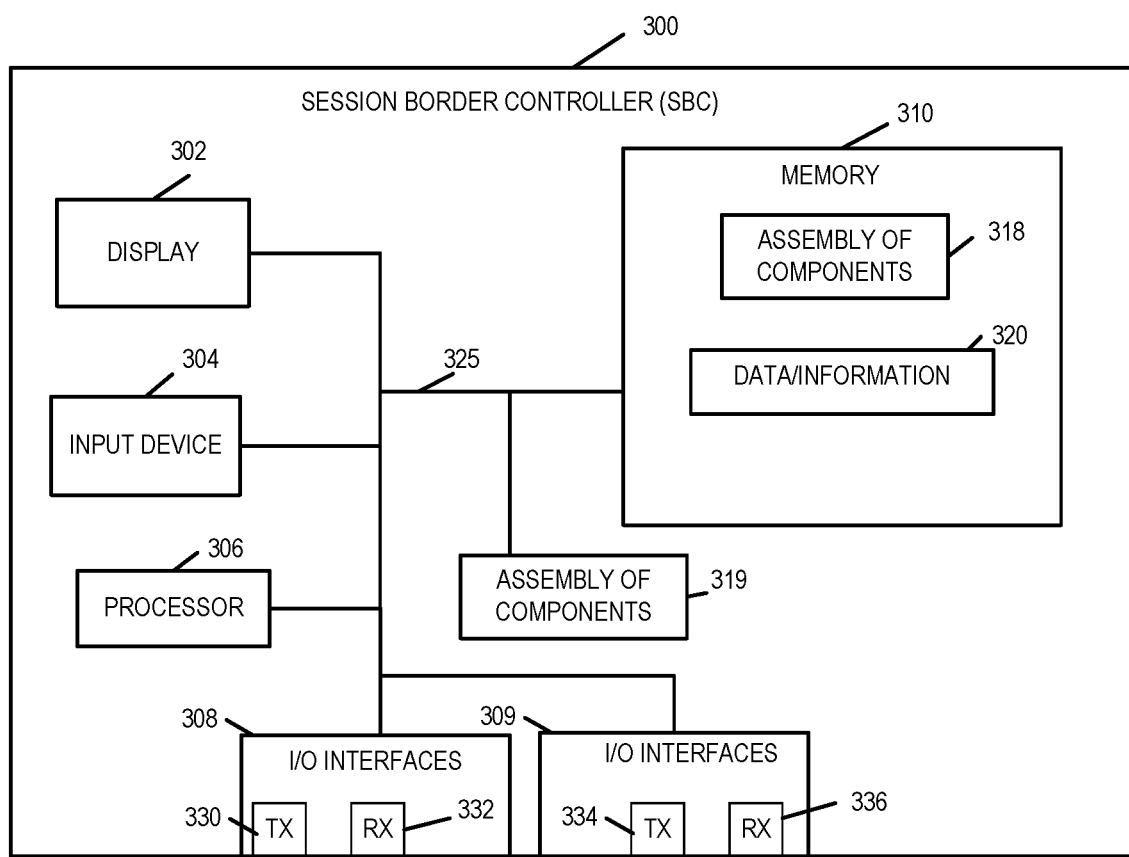
FIG. 3 illustrates an exemplary session border controller in accordance with one embodiment of the present invention.

FIG. 3 illustrates an exemplary embodiment of a Session Border Controller 300 in accordance with one embodiment of the present invention. Exemplary session border controller 300 includes a display 302, an input device 304, a processor 306, e.g., a CPU, input/output (I/O) interfaces 308 and 309, which couple the SBC to a core network or various other devices including NAT device(s) and SIP Application Server, memory 310, and an assembly of components 319, e.g., circuits corresponding to different components, coupled together via a bus 325 over which the various elements may interchange data and information. Memory 310 includes an assembly of components 318, e.g., an assembly of software components (e.g., control routines and instructions that when executed by the processor control the operation of the SBC 300, and data/information 320. The I/O interfaces 308 includes transmitters 330 and receivers 332, e.g., input/output hardware circuitry including transmitter and receiver circuitry. The I/O interfaces 309 similar to the I/O Interfaces 308 include transmitters 334 and receivers 336. The I/O interfaces in some embodiments are configured to communicate in accordance with the Transport Control Protocol, User Datagram Protocol and Session Initiation Protocol. In some embodiments, the SBC 300 includes a communication component configured to operate using TCP, UDP and SIP protocol signaling methods. In some embodiments, the communication component is a hardware component, a software component or a component including hardware and software components. In some embodiments, SBC 106 of FIGS. 1 and 2 is SBC 300 of FIG. 3.

Figure 4:
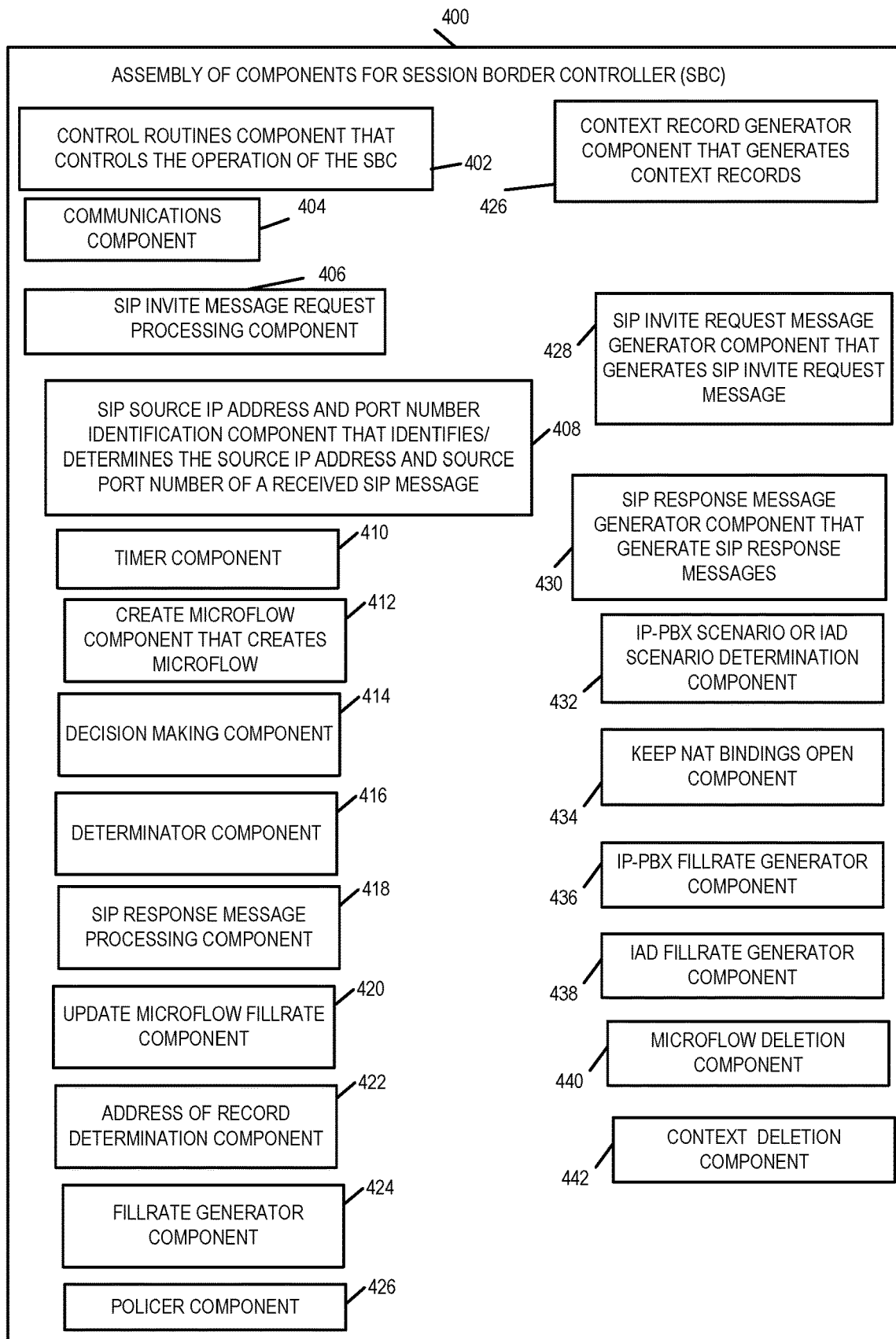
FIG. 4 illustrates an assembly of components for use in a session border controller in accordance with one embodiment of the present invention.

FIG. 4 is a drawing illustrating an assembly of components 400 which may be included in the exemplary Session Border Controllers of FIG. 1, 2, 3, or 9. For example SBC 106 of FIGS. 1 and 2 and SBC 300 of FIG. 3. Assembly of components 400 can be, and in some embodiments is, used in SBC 300. The components in the assembly of components 400 can, and in some embodiments are, implemented fully in hardware within the processor 306, e.g., as individual circuits. The components in the assembly of components 400 can, and in some embodiments are, implemented fully in hardware within the assembly of components 319, e.g., as individual circuits corresponding to the different components. In other embodiments some of the components are implemented, e.g., as circuits, within the processor 306 with other components being implemented, e.g., as circuits within assembly of components 319, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 310 of the SBC 300, with the components controlling operation of SBC 300 to implement the functions corresponding to the components when the components are executed by a processor, e.g., processor 306. In some such embodiments, the assembly of components 300 is included in the memory 310 as assembly of components 318. In still other embodiments, various components in assembly of components 300 are implemented as a combination of hardware and software, e.g., with another circuit external to the processor providing input to the processor 306 which then under software control operates to perform a portion of a component's function. While shown in the FIG. 3 embodiment as a single processor, e.g., computer, it should be appreciated that the processor 306 may be implemented as one or more processors, e.g., computers.

When implemented in software the components include code, which when executed by the processor 306, configure the processor 306 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the SBC device 300 or elements therein such as the processor 306, to perform the functions of corresponding steps illustrated and/or described in the method of one or more of the flowcharts or pseudo-code of FIGS. 7, 8, 10, 11, 12 and/or described with respect to any of the FIGS. 1, 2, 3, 9. Thus the assembly of components 300 includes various components that perform functions of corresponding steps of one or more of FIGS. 7, 8, 9, 10, 11 and 12.

Assembly of components 400 includes the following components. A control routines component 402 that controls the operation of the SBC 300. A communications component 404 that provide communications functionality including communications signaling and support for various communications protocols and interfaces. An incoming SIP INVITE request message processing component 406 that provide processing for incoming SIP INVITE request messages. A SIP source IP address and port number identification component that identifies/determines the source I address and source port number of a received SIP message, e.g., a SIP INVITE or SIP response message. A timer component 410 that is a timer and used to time events such as when the fillrate for microflows should be updated. The assembly of components includes a create microflow component 412 that creates microflows. The assembly of components includes a decision making component 414 which is used in making various decisions such as those described in connection with FIG. 10. The assembly of components includes a determinator component 416 that makes determinations based on inputs such as those describe in connection with FIGS. 8 and 10. The assembly of components also includes a SIP Response message processing component 418 that processes SIP response messages such as for example SIP 200, SIP 401 and SIP 407 response messages; an update microflow fillrate component 420 that updates microflow fillrates; an address of record determination component 422 that determines the address of record included in a SIP message, determines the address of record included in context records, etc.; a fillrate generator component 424 that generates microflow and packet flow fillrates for packet policers such as token bucket policer, a policer component 426 that generates policers, e.g., token bucket policers, that perform policing of packet flows such as microflows; a context record generator component 426 that generates context records.

The assembly of components 400 further includes a SIP INVITE request message generator component 428 that generates SIP INVITE request message and a SIP response message generator component 430 that generates SIP response messages.

The assembly of components 400 also includes an IP-PBX scenario or an IAD scenario determination component 432 that determines whether an IP-PBX scenario or an IAD scenario is in use and whether the SBC should operate in a first mode of operation in which an IP-PBX microflow fillrate is used or in a second mode of operation in which an IAD microflow fillrate is used. The assembly of components 400 includes a Keep NAT bindings open component 434 that implements the operation discussed in connection with routine 1200 illustrated in FIG. 12. The assembly of components 400 further includes an IP-PBX fillrate generator component 436 that generators IP-PBX fillrates, an IAD fillrate generator component 438 that generates an IAD fillrate, a microflow deletion component 440 that deletes microflows, and a context deletion component 442 that deletes contexts, context records, or source IP address, source port and microflow information from contexts and context records.

Figure 5:
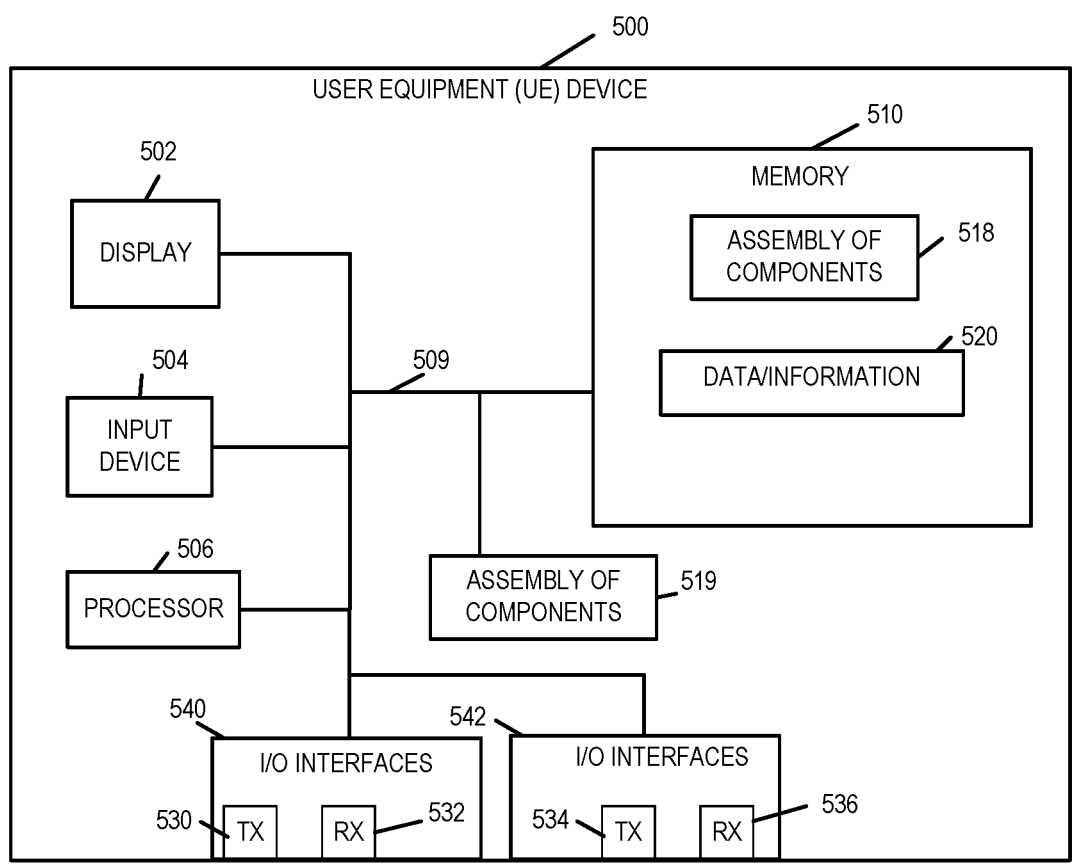
FIG. 5 illustrates an exemplary endpoint device shown as a user equipment device (UE) in accordance with one embodiment of the present invention.

FIG. 5 illustrates an exemplary embodiment of a User Equipment (UE) device in accordance with one embodiment of the present invention. Exemplary user equipment device 500 includes a display 502, an input device 504, a processor 506, e.g., a CPU, input/output (I/O) interfaces 540 and 542, which couple the UE to the IP-PBX or IAD, memory 510, and an assembly of components 519, e.g., circuits corresponding to different components, coupled together via a bus 509 over which the various elements may interchange data and information. Memory 510 includes an assembly of components 518, e.g., an assembly of software components, and data/information 520. The I/O interface 540 includes transmitters 530 and receivers 532. The I/O interface 542 includes transmitters 534 and receivers 536 which may be implemented as hardware transmitter and receiver circuitry.

The I/O interfaces in some embodiments are configured to communicate in accordance with the Transport Control Protocol, User Datagram Protocol and Session Initiation Protocol. In some embodiments, the UE 500 includes a communication component configured to operate using TCP, UDP and SIP protocol signaling methods. In some embodiments, the communication component is a hardware component, a software component or a component including hardware and software components. In some embodiments, the user equipment devices of UE 1, UE 2, UE 3, . . . , UE N, UE 1A, . . . , UE 1J of FIGS. 1 and 2 are implemented in accordance with user device 500 of FIG. 5. In some embodiments, user equipment device includes one or more receiver components for receiving SIP messages, transmitter components for transmitting SIP messages, a memory storage control component for managing storage of data and message information, and message generation component for generating messages such as SIP messages.

Figure 6:
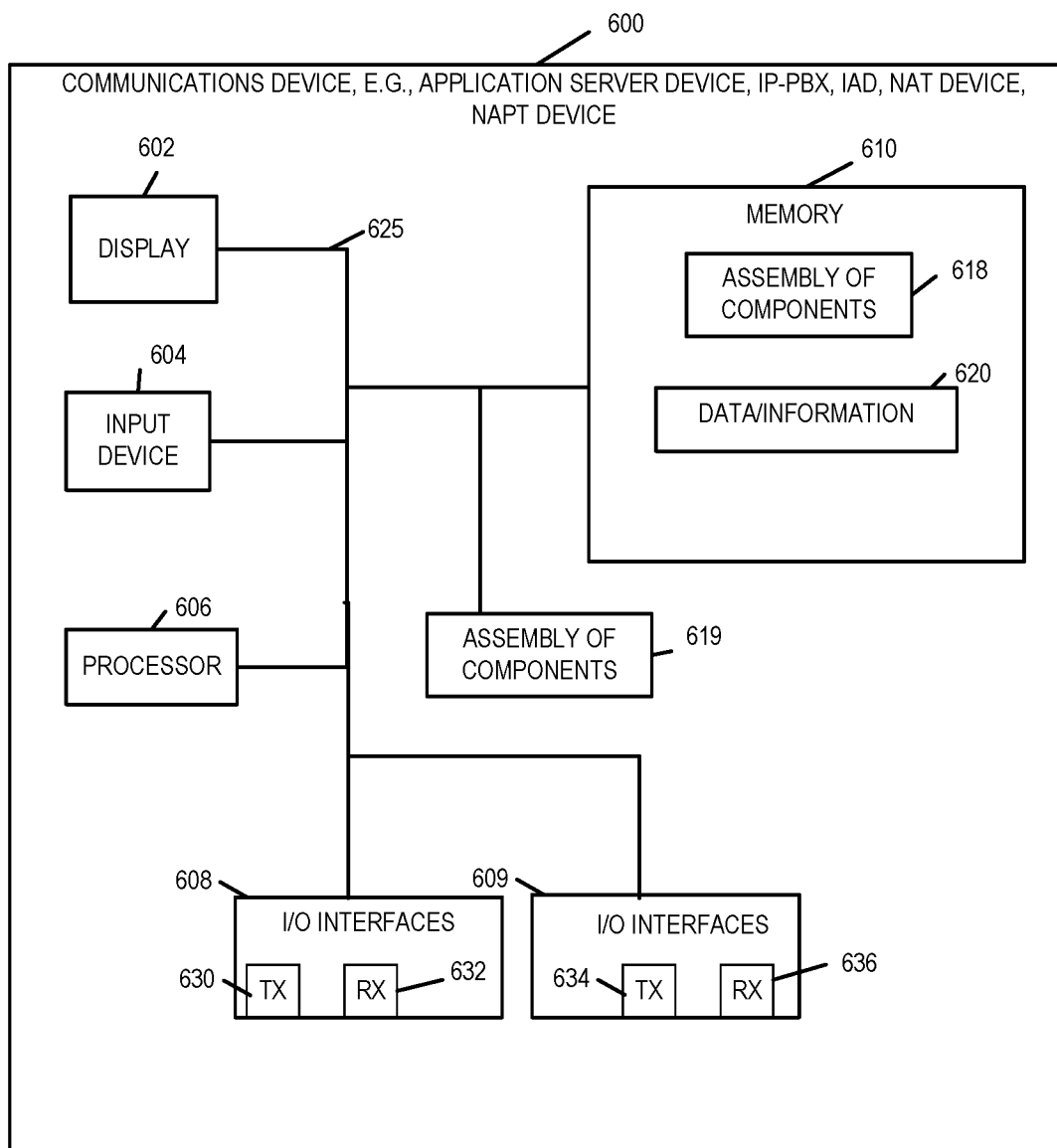
FIG. 6 illustrates exemplary aspects of a communications device in accordance with one embodiment of the present invention which may be used to implement a SIP Application Server, a NAT device, an IP-PBX device, and/or an IAD device

FIG. 6 illustrates an exemplary embodiment of a communications device 600 such as for example an Application Server/Registrar device, IP-PBX, IAD, NAT device, a NAPT device in accordance with one embodiment of the present invention. Exemplary communications device 600 includes a display 602, an input device 604, a processor 606, e.g., a CPU, input/output (I/O) interfaces 608 and 609, which couple the communications device to networks and other devices, memory 610, and an assembly of components 619, e.g., circuits corresponding to different components, coupled together via a bus 625 over which the various elements may interchange data and information. Memory 610 includes an assembly of components 618, e.g., an assembly of software components, and data/information 620. The I/O interface 608 includes transmitters 630 and receivers 632 which may be implemented as hardware circuitry. The I/O interface 609 includes transmitters 634 and receivers 636. The I/O interfaces in some embodiments are configured to communicate in accordance with the Transport Control Protocol and Session Initiation Protocol and User Datagram Protocol. In some embodiments, the communications device 600 includes a communication component configured to operate using TCP, UDP and SIP protocol signaling methods. In some embodiments, the communication component is a hardware component, a software component or a component including hardware and software components. In some embodiments, the communications device 600 includes one or more of the following components: a receiver components for receiving SIP messages, a SIP message processing component, transmitter components for transmitting SIP messages, an authentication component for authenticating messages, a memory storage control component for managing storage of data and message information, a message generation component for generating messages such as SIP response messages, a challenge generation component that generates authentication challenges for SIP 401 and 407 response messages, a IP address translator component that performs IP address translation, a port number translation component that performs port number translation.

In some embodiments, the application server 108 of FIGS. 1 and 2 is implemented in accordance with the communications device 600.

In some embodiments, the IP-PBX 1 120 and IP-PBX L 121 of FIG. 1 are implemented in accordance with the communications device 600.

In some embodiments, the NAT device 122 of FIGS. 1 and 2 is implemented in accordance with the communications device 600.

By way of example, when the application server 108 is implemented in accordance with communication device 600 the I/O interfaces 608 and 609 couple the application server to the network 107 and to SBC 106; when the NAT device 122 is implemented in accordance with the communications device 600 the I/O interfaces couple the NAT 122 to the SBC 106 and to the IP-PBXs 120 and 122 or the IADs 220 and 221; when the IP-PBX 120 is implemented in accordance with the communications device 600 the I/O interfaces 608 and 609 couple the IP-PBX 120 to the user equipment devices and the NAT 122; and when the IAD 220 is implemented in accordance with communications device 600 the I/O interfaces 608 and 609 couple the IAD 220 to the user equipment devices and the NAT device 122.

Figure 7:
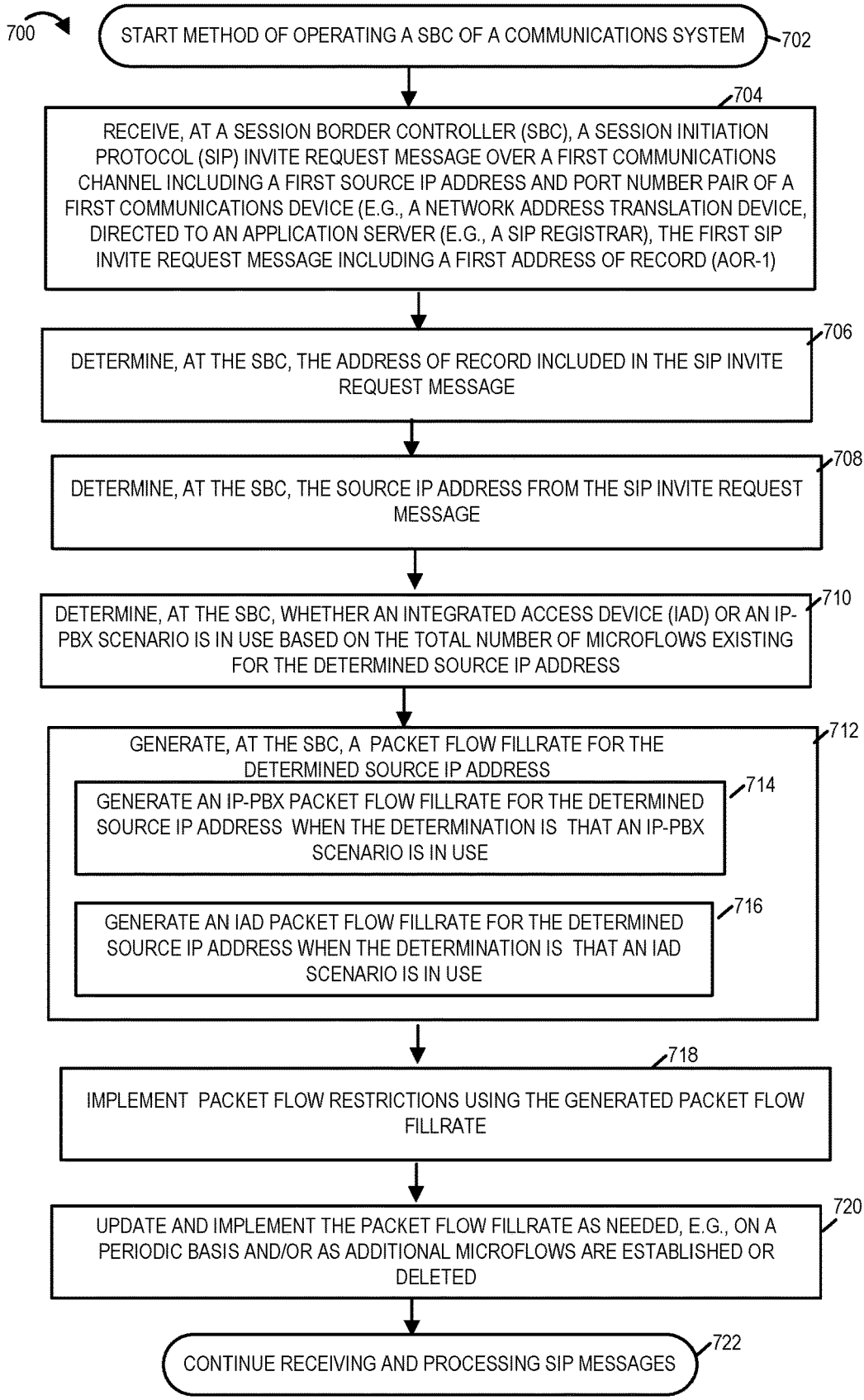
FIG. 7 illustrates a flowchart showing the steps of an exemplary communications method in accordance with one embodiment of the present invention.

An exemplary communications method 700 that provides efficient packet flow fillrate adjustment for distributed denial of service protection and minimizes overallocation of resources (e.g., bandwidth, packet processing capability) to individual packet flows sometimes referred to as microflows is illustrated in FIG. 7. In FIG. 7, the exemplary method 700 may be, and typically is, implemented using exemplary system 100 or system 200 of FIGS. 1 and 2 respectively. The method describes the operation of the SBC 106 in the system 100 or 200. In some embodiments, one or more of the steps of the method are stored as software instructions in a control routine component stored in the memory 310 of the SBC 106 which when executed by the processor 306 control the SBC to perform the operation described in one or more of the steps of the method 700.

The method 700 will now be explained in connection with the steps of the flowchart illustrated in FIG. 7. Operation begins in start step 702. Operation proceeds from step 702 to step 704.

In step 704, SBC (e.g., SBC 106) receives via one of its receivers of its I/O interfaces a Session Initiation Protocol (SIP) INVITE request message over a first communications channel directed to an SIP application server (e.g., SIP application server 108). The SIP INVITE request message includes a first source IP address and port number pair of a first communications device (e.g., a network address translation device 122) and a first address of record (AOR-1). Operation proceeds from step 804 to step 806.

In step 706, the SBC determines the address of record included in the SIP INVITE request message. Operation proceeds from step 706 to step 708.

In step 708, the SBC determines the source IP address from the received SIP INVITE request message. Operation proceeds from step 708 to step 710.

In step 710, the SBC determines whether an integrated access device (IAD) or an IP-PBX scenario is in use based on the total number of packet flows or microflows currently in existence at the SBC for the determined source IP address. In some embodiments, the SBC determines whether an integrated access device or an IP-PBX scenario is in use based on an IAD threshold value. In some such embodiments, if total number of packet flows/microflows currently in existence at the SBC for the determined source IP address is less than the IAD threshold value, the SBC determines that an IP-PBX scenario is in use otherwise an IAD scenario is in use. That is if the total number of packet flows/microflows is equals or exceeds the IAD threshold value then the SBC determines that an IAD scenario is in use. Operation proceeds from step 710 to step 712. In some embodiments in which multiple public IP addresses are used for IP-PBXes/IADs for example when more than one NAT device is used or when a single NAT device uses multiple public IP addresses, the public IP subnet mask is used instead of the public IP Address of the NAT device(s) when counting the total number of microflows to determine whether an IAD or IP-PBX scenario should be assumed.

In step 712, the SBC generates a packet flow fillrate. Step 712 includes sub-steps 714 and 716. In sub-step 714, the SBC generates an IP-PBX packet flow fillrate, e.g., for the determined source IP address, when the determination is that an IP-PBX scenario is in use. The IP-PBX packet flow fillrate may be, and in some embodiments is, based on one or more of the following: call admission control (CAC) rate, average number of messages per call, average number of octets per call, and a cushion or reserve factor, the total number of current Address of Records on the source IP address, the total number of packet flows or microflows on the source IP address. The call admission control rate is typically determined as the number of calls per second for a particular deployment of a network segment. For example, the CAC rate may be 15 calls per second or 100 calls per second. CAC rate may be, and typically is used by the SBC in determining when to reject calls, e.g., Voice Over Internet Protocol (VOIP) calls and packet flows corresponding to the calls based on processing power (i.e. insufficient processing power to handle the call), the upstream and downstream traffic, e.g., packet flows, exceeds pre-specified thresholds, or the number of calls being handled exceeds a specified limit. The cushion or reserve factor is a fixed positive number greater than one, e.g., 1.1 or 1.2, used to provide some excess capacity to ensure against the unwanted dropping of packets. The average number of messages per call and the average number of octets per call may be, and typically are, determined by the SBC during or in connection with the call processing operations performed by the SBC in connection with calls handled the SBC, e.g., being anchored by the SBC. The total number of current AORs on the source IP address being the total number of currently authenticated AORs for which packet flows or microflows are currently being supported by the SBC. The total number of packet flows or microflows on the source IP address is the total number of packet flows or microflows which are currently being supported on the SBC for which authentication of the SIP INVITE message for the packet flow or microflow has already been successfully completed. In some embodiments the following equation is used to determine the IP-PBX packet flow fillrate for the SIP INVITE message from the source IP address which in this example is the first source IP address:

IP-PBX packet flow fillrate based on CAC=(CAC rate)*(average number of messages per call)* (average number of octets per call)*(cushion factor)/(total number of current AoRs on source IP address)

When the SIP INVITE message is the first/initial or the only SIP INVITE message which has been authenticated for the source IP address then the total number of current AoRs on source IP address is one.

In sub-step 716, the SBC generates an IAD packet flow fillrate, e.g., for the determined source IP address, when the determination is that an IAD scenario is in use. The IAD packet flow fillrate may be, and in some embodiments is, based on one or more of the following: call admission control (CAC) rate, average number of messages per call, average number of octets per call, a cushion or reserve factor, and the maximum expected number of IADs. As previously explained, the call admission control rate is typically determined as the number of calls per second for a particular deployment of a network segment and may be, and typically is, used by the SBC in determining when to reject calls, e.g., Voice Over Internet Protocol (VOIP) calls and packet flows corresponding to the calls based on processing power (i.e. insufficient processing power to handle the call), the upstream and downstream traffic, e.g., packet flows, exceeds pre-specified thresholds, or the number of calls being handled exceeds a specified limit. The cushion or reserve factor is a fixed positive number greater than one, e.g., 1.1 or 1.2, used to provide some excess capacity to ensure against the unwanted dropping of packets. The average number of messages per call and the average number of octets per call may be, and typically are, determined by the SBC during or in connection with the call processing operations performed by the SBC in connection with calls handled the SBC, e.g., being anchored by the SBC. The maximum expected number of IADs is a positive integer number and is typically a predetermined number inputted as part of an SBC initialization or configuration process. In some embodiments the following equation is used to determine the IP-IAD packet flow fillrate:

IAD packet flow fillrate based on CAC=[(CAC rate)*(average number of messages per call)* (average number of octets per call)*(cushion factor)]/(maximum expected number of IADs)

Operation proceeds from step 712 to step 718.

In step 718, the SBC implements packet flow restrictions using the generated packet flow fillrate, e.g., by rejecting packets of packet flows or microflows that exceed the generated packet flow fillrate. In some embodiments, the SBC instructs one or more devices such as network switches positioned between the first communications device and the SBC through which the packet flow must pass to restrict the packet flows sent to the SBC to the generated packet flow fillrate. Operation proceeds from step 718 to step 720.

In step 720, the SBC updates the packet flow fillrate as needed for example on a periodic basis based on a predetermined time interval and/or as additional packet flows or microflows are established or deleted. After updating the packet flow fillrate, the SBC implements or causes to be implemented the packet flow restrictions using the updated packet flow fillrate. In some embodiments, the IP-PBX packet flow fillrate is updated based a call admission control rate and the total number of current address of records in existence at the SBC for the source IP address at the time of the update. Operation proceeds from step 720 to step 722.

In step 722 the SBC continues receiving and processing SIP messages. The SBC typically restricts the number of packets allowed from the determined source IP address and port number pair (i.e., packet flow fillrate for packets from the determined source IP address and port number) by using a token bucket policer with a first fillrate value of zero until the SIP INVITE request message has been authenticated for example by a SIP application server to which the SBC sends a SIP INVITE request message on behalf of the first communications device. The first fillrate value is set to zero and hence is less than the packet flow fillrate generated in step 712. The token bucket policer including a bucket size that allows a few packets such as for example three or four packets so as to allow for authentication, for example where the first communications device needs to send an additional SIP INVITE request message with authentication credentials in response to a SIP 401 or 407 response message. The policer's packet restrictions being based on the fillrate and token bucket size.

FIG. 8 consisting of FIGS. 8A and 8B illustrate exemplary pseudocode of an exemplary embodiment of the present invention. The pseucodocode 800 is for an exemplary method of efficient packet flow fillrate adjustment and (D)DOS distributed denial of service protection when an SBC is receiving and providing services to IP-PBX(es) or IAD(s) from which it receives SIP INVITE request messages from unknown/authenticated public IP address(es) such as when the SIP INVITE request messages are received from the IP-PBX(es) or IAD(s) via a NAT device.

The pseudocode describes steps or instructions for operations that may be, and in some embodiments are, stored in memory and implemented by one or more processors or hardware circuits in one or more hardware device(s) such as for example an Access Session Border Controller, e.g., the SBC 106 of FIG. 1 or 2. In some embodiments, one or more processors control the hardware device, e.g., session border controller, to perform the steps described in the pseudocode.

Pseudocode 800 illustrated in FIG. 8A begins at line 1000 wherein a hardware device, e.g., a Session Border Controller (SBC), is operated to receive an initial Session Initiation Protocol (SIP) INVITE message for Address of Record-1 (AoR-1).

Lines 1010 to 1165 shown on FIG. 8A illustrate steps or operations taken to determine efficient packet flow fillrates and provide distributed denial of service attack protection when a SIP INVITE request message is received. The steps or operations illustrate, among other things, determinations/decisions to be made regarding whether a context exists for the address of record included in the SIP INVITE request message, when to create, update and/or delete contexts for the AoR in the received SIP INVITE request message, when to create and/or delete a microflow in response to the SIP INVITE request message, determining and setting an initial packet flow fillrate and then updating the packet flow fillrate upon successful authentication of the request.

Lines 1170 to 1200 shown on FIG. 8A illustrate steps or operations to be performed when an error response such as a SIP 4XX response is received for a subsequent SIP INVITE message sent in response to a SIP 401 or 407 response message including a challenge requesting authentication credentials.

Lines 1210 to 1375 shown on FIG. 8A illustrate pseudocode for a routine that is used to determine a microflow packet flow fillrate based on whether an IP-PBX scenario or IAD scenario is in use.

Lines 1380 and 1390 shown on FIG. 8B illustrate pseudocode for generating an IP-PBX rate based on CAC rate (call admission control rate). The IP-PBX rate is used by the microflow fillrate determination routine.

Lines 1400 to 1420 shown on FIG. 8B illustrate pseudocode for generating an IAD rate based on CAC rate. The IAD rate based on CAC rate is used by the microflow fillrate determination routine.

Lines 1430 to 1460 illustrate pseudocode for generating an IP-PBX rate adjustment based on CAC rate and current number of AoRs (Address of Records) on an IP address. The IP-PBX Rate Adjustment based on CAC rate and current number of AoRs on an IP address is used in IP-PBX Rate Adjustment routine.

Lines 1470 to 1510 illustrate pseudocode for IP-PBX Rate Adjustment routine that is run periodically based on the expiration of timer that is reset each time the IP-PBX Rate adjustment routine is completed. The IP-PBX Rate Adjustment pseudocode includes instructions that when executed operates the SBC to adjust the packet flow fillrate for each of the IP address port number pairs (corresponding to an IP-PBX) being serviced by the SBC when the SBC is operating in a IP-PBX scenario. In such a case each of the microflows with the source IP address and port number corresponding to an IP-PBX will have its microflow packet flow fillrate updated to be the IP-PBX rate adjustment based on CAC and current number of AoRs packet flow fillrate.

Lines 1520 to 1610 illustrate a Keep NAT bindings open routine that is performed on an on-going basis once the SBC receives a SIP INVITE message from a NAT device.

As discussed above the present invention is also applicable to communications systems in which multiple public IP addresses can be used for IP-PBXes/IADs for example when more than one NAT device is used or when a single NAT device uses multiple public IP addresses. This is achieved by using the public IP subnet mask instead of the public IP Address of the NAT device(s) when counting the total number of microflows to determine whether an IAD or IP-PBX scenario should be assumed. See line 1260 of FIG. 8A.

Figure 9:
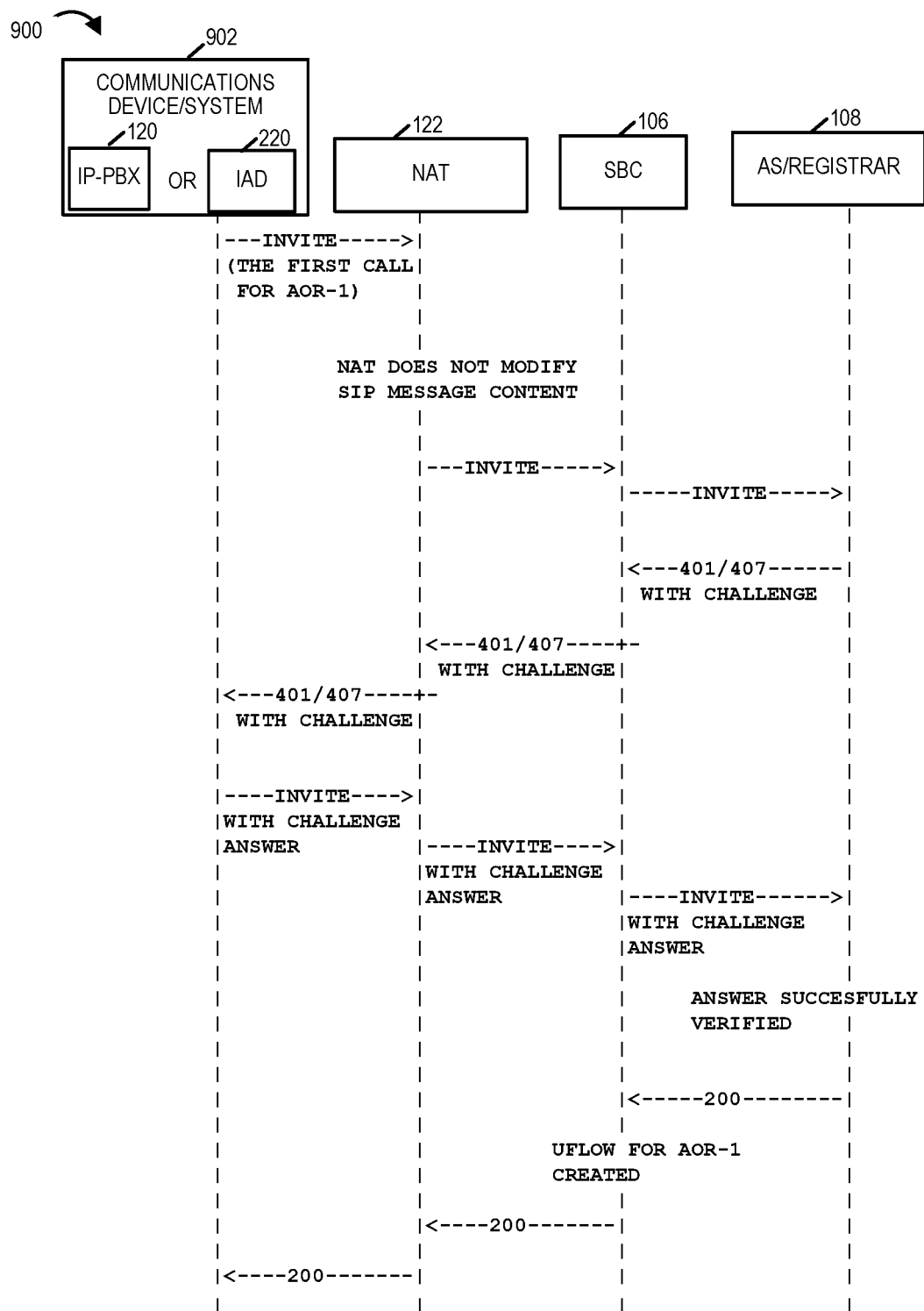
FIG. 9 illustrates an exemplary signaling flow diagram of an exemplary embodiment of the present invention.

FIG. 9 illustrates an exemplary signaling flow diagram 900 of an exemplary embodiment of the present invention. For explanatory purposes simplified SIP request and response messages are depicted with the information which is most pertinent to explaining the present embodiment of the invention shown. As it will be appreciated additional information and formatting of the messages as well as the use of additional messages may be and typically is used in requesting services in connection with initiating a Voice Over Internet Protocol call session. The communications device or system 902 includes either the IP-PBX 120 or the IAD 220. The system can also include user devices coupled to the IP-PBX 120 or the IAD 220. The IP-PBX 120 or IAD 220 receives a call initiation request from the user devices and in turn transmits a SIP INVITE request message for service over an IP communication network to the NAT device 122. As can be seen from the signaling flow diagram an initial SIP INVITE request message for a first address of record (AoR-1) is sent from the communications system 902 to the NAT 122. The NAT 122 receives the SIP INVITE request message and generates a second SIP INVITE message based on the first SIP INVITE message received from the communications device 902. The NAT 122 does not modify the SIP message content of the first SIP INVITE request message received from the communications device 902. The NAT 122 transmits the generated second SIP INVITE request message from the NAT 122 to the SBC 106. The NAT 122 transmits the second SIP INVITE request message from a public IP address and port number. The SBC 106 receives the second SIP INVITE request message. The SBC generates a third SIP INVITE request message based on the second SIP INVITE request message and transmits it from the SBC 106 to the Application Server/Registrar 108. The Application Server/Registrar 108 receives the third SIP INVITE request message from the SBC 106 and generates a first SIP 401 or 407 response message with an authentication challenge. The Application Server/Registrar 108 transmits the first SIP 401 or 407 response message with an authentication challenge to the SBC 106. The SBC 106 receives the first SIP 401/407 response message with the authentication challenge from the Application Server/Registrar 108. The SBC 106 generates a second SIP 401/407 response message with the authentication challenge based on the first SIP response message received from the Application Server/Registrar 108. The SBC 106 transmits the second SIP response message with challenge to the NAT 122. The NAT 122 receives the second SIP response message with challenge from the SBC 106. The NAT 122 generates a third SIP 401/407 response message with the authentication challenge based on the received second SIP 401/407 response message. The NAT 122 transmits the third SIP 401/407 response message to the communication system

902. A fourth SIP INVITE request with an answer to the authentication challenge is generated by either the user device that sent the initial call initiation request to the IP-PBX or IAD or by the IP-PBX or IAD. The communication system 902 sends the fourth SIP INVITE request message with the answer to the challenge to NAT 122. The NAT 122 receives the fourth SIP INVITE request message with the challenge answer from the IP-PBX 120 or IAD 220 of the communications system 902 and based on the received fourth SIP INVITE request message generates a fifth SIP INVITE request message with the answer to the challenge. The NAT 122 transmits the fifth SIP INVITE request message from the NAT 122 to the SBC 106. The SBC 106 receives the fifth SIP INVITE request message with the answer to the challenge from the NAT 122 and generates a sixth SIP INVITE request message with the answer to the challenge. The SBC 106 transmits the sixth SIP INVITE request message from the SBC 106 to the Application Server/Registrar 108. The Application Server/Registrar 108 receives the sixth SIP INVITE request message with the answer to the challenge from the SBC 106. The Application Server/Registrar 108 in response to receiving the sixth SIP INVITE request message performs an authentication test on the answer provided to the challenge. In this example, the answer is successfully authenticated/verified. The Application Server/Registrar 108 in response to successfully authenticating/verifying the answer to the challenge generates a first SIP 200 response success message and transmits the first SIP 200 response message from the Application Server/Registrar 108 to the SBC 106. The SBC 106 receives the first SIP 200 response from the Application Server/Registrar 108 determines that it is success message and creates a microflow for the first address of record (AoR-1) and determines an IP-PBX or IAD microflow fillrate for the microflow for the first address of record (AoR-1) based on the total number of microflows that are active at the SBC 106 on the source IP address of the second SIP INVITE request message. The SBC 106 also generates a second SIP 200 response message based on the received SIP 200 response message. The SBC 106 sends the second SIP 200 response message to the NAT 122. The NAT 122 receives the second SIP 200 response message and generates a third SIP 200 response based on the second SIP 200 response message. The NAT 122 transmits the third SIP 200 response message to the communications system 902 where it received by either the IP-PBX 120 or the IAD 220.

Figures 10, 10G:
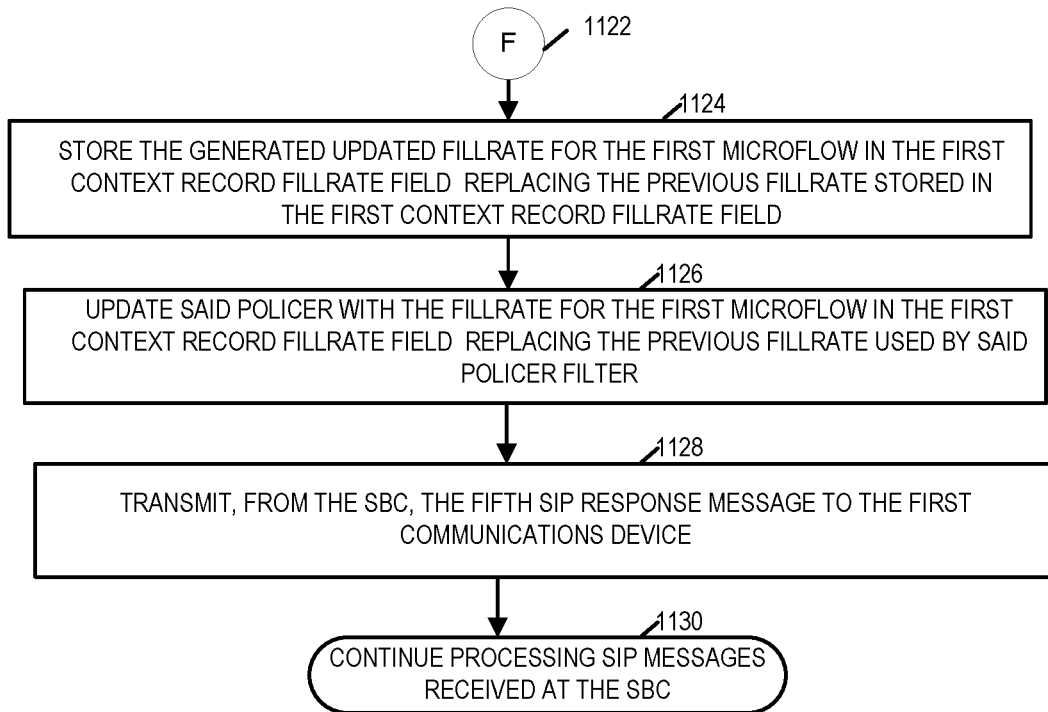
FIG. 10 illustrates the combination of FIGS. 10A, 10B, 10C, 10D, 10E, 10F, 10G, 10H, 10I.
FIG. 10G illustrates a seventh part of a flowchart showing the steps of an exemplary communications method in accordance with one embodiment of the present invention.
Figure 10A:
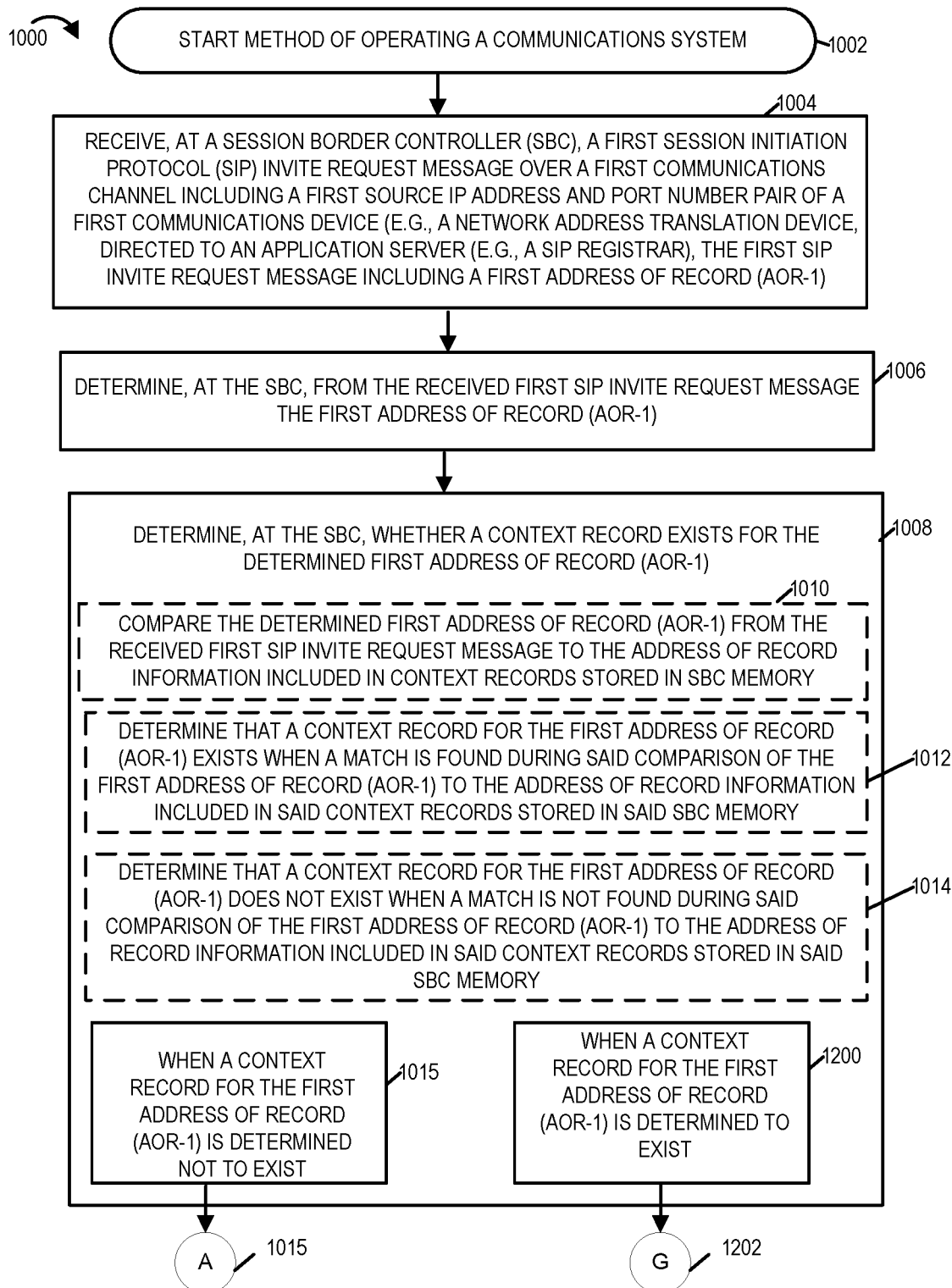
FIG. 10A illustrates a first part of a flowchart showing the steps of an exemplary communications method in accordance with one embodiment of the present invention.
Figure 10B:
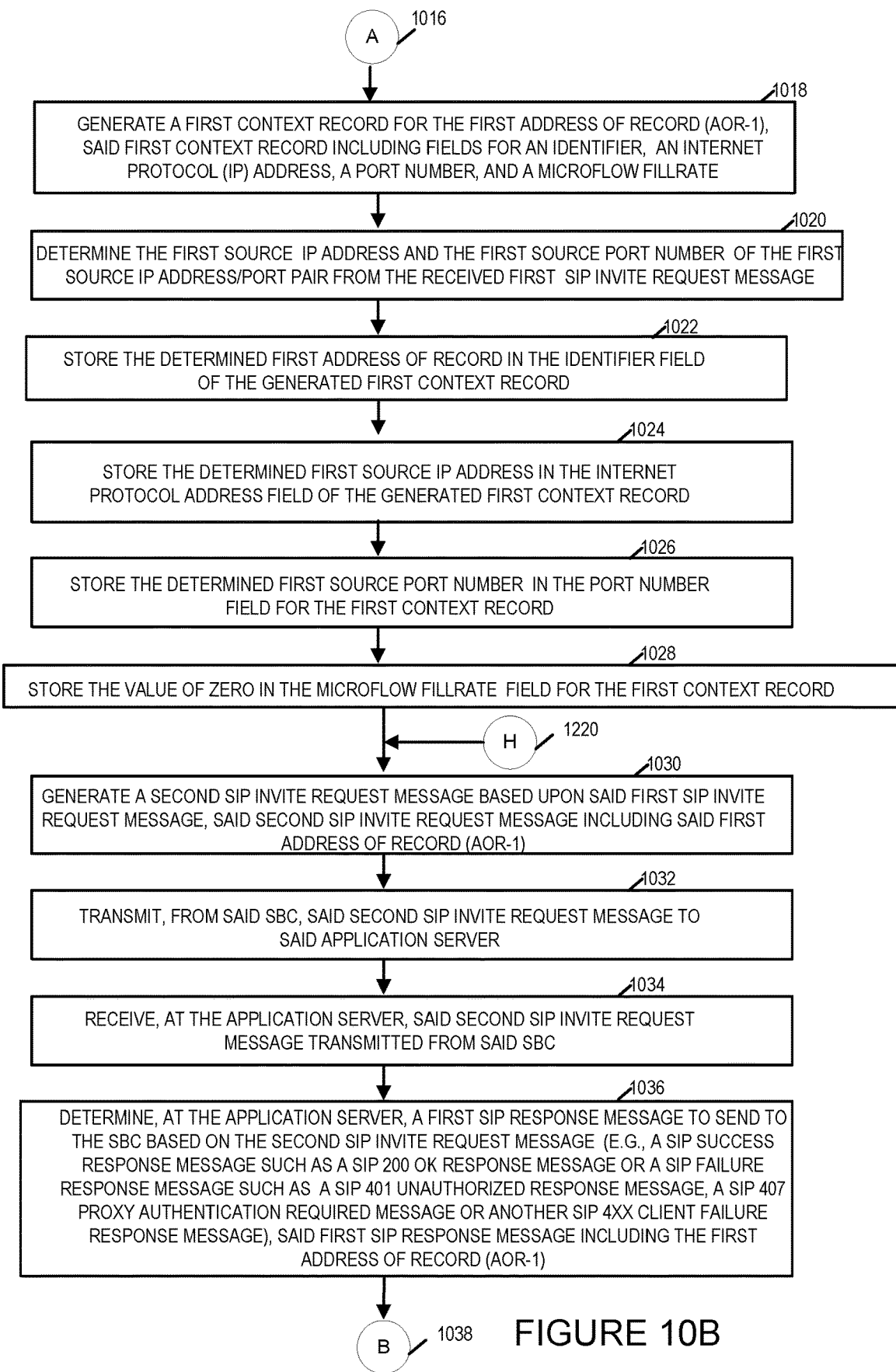
FIG. 10B illustrates a second part of a flowchart showing the steps of an exemplary communications method in accordance with one embodiment of the present invention.
Figure 10C:
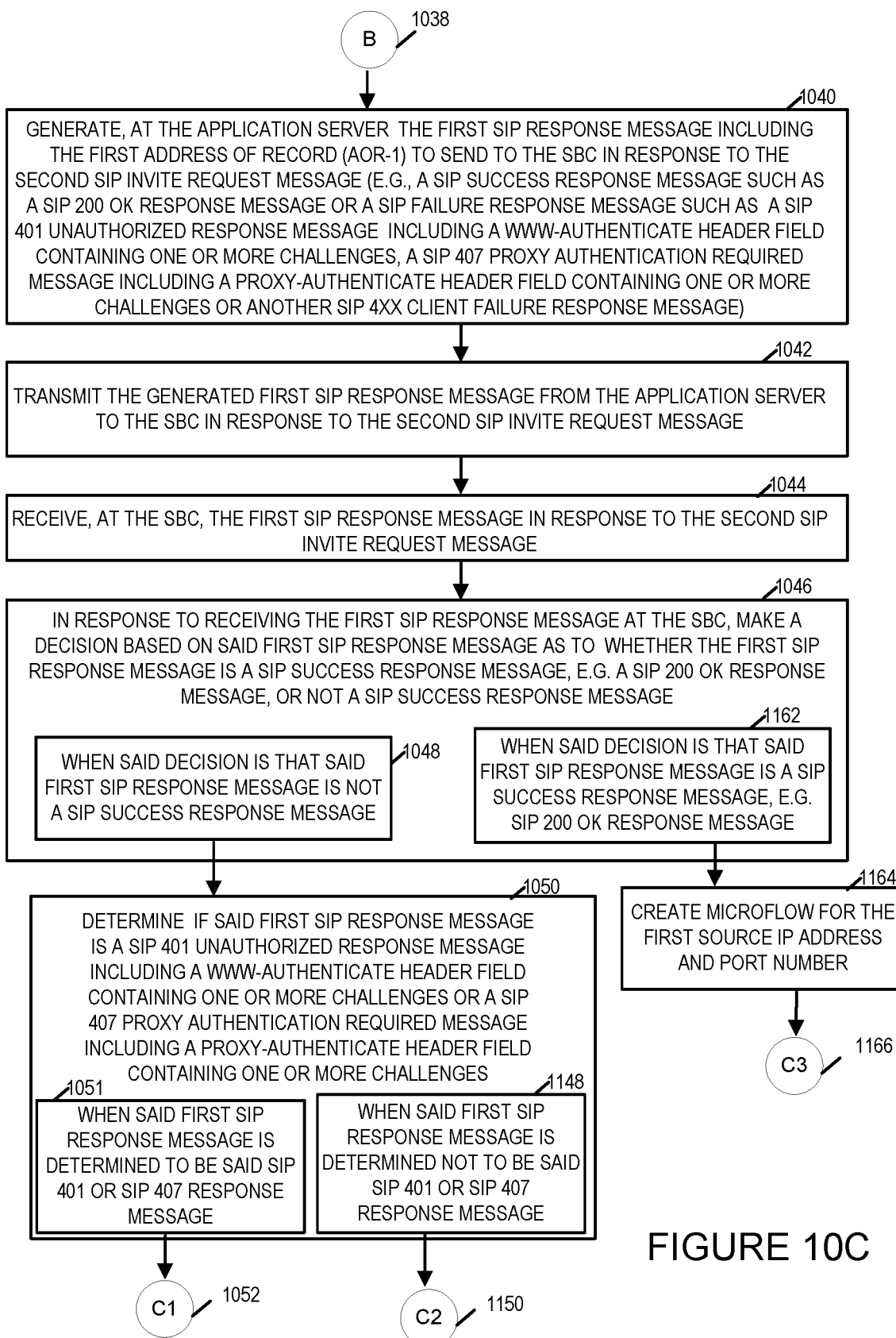
FIG. 10C illustrates a third part of a flowchart showing the steps of an exemplary communications method in accordance with one embodiment of the present invention.
Figure 10D:
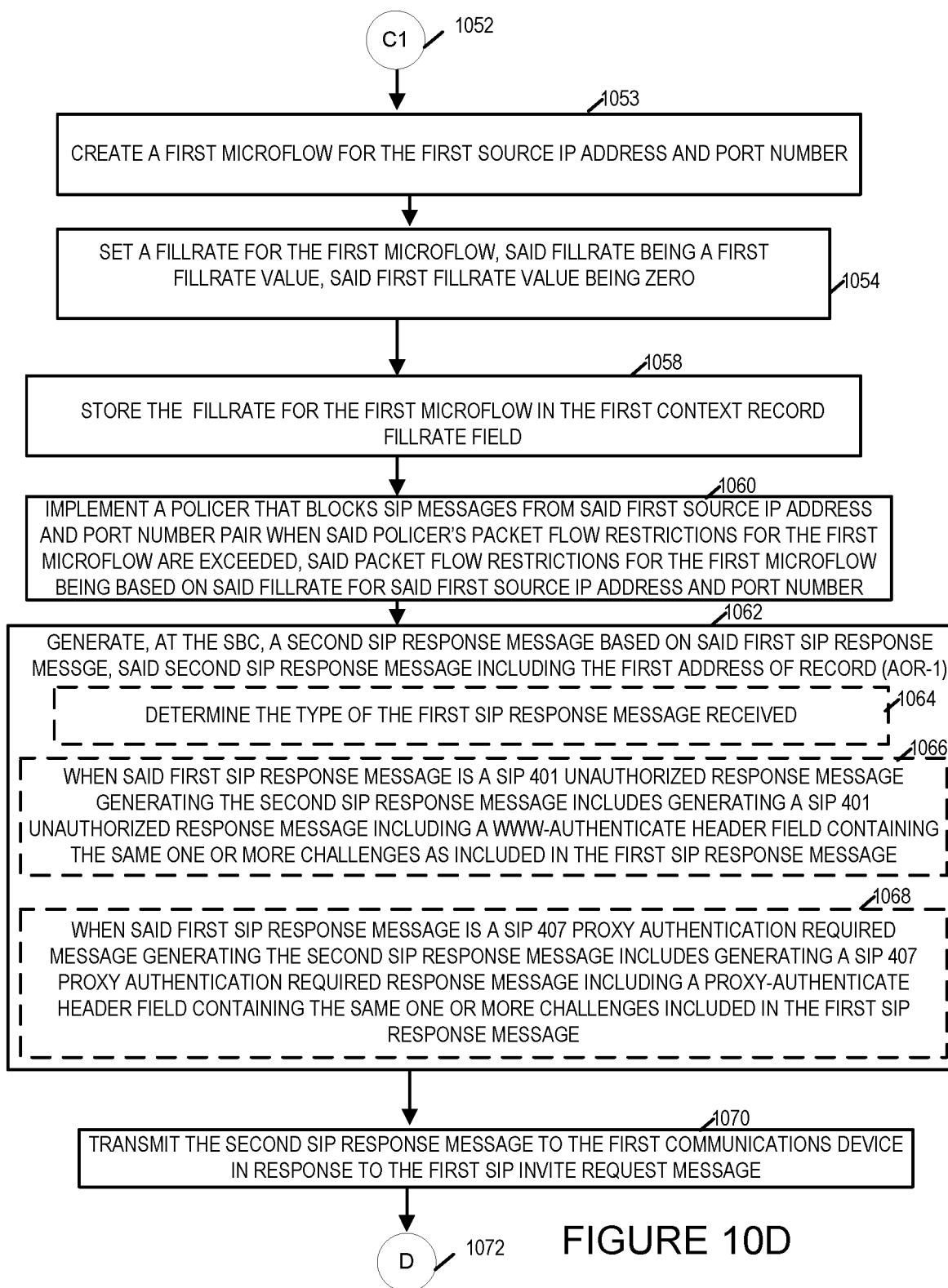
FIG. 10D illustrates a fourth part of a flowchart showing the steps of an exemplary communications method in accordance with one embodiment of the present invention.
Figure 10E:
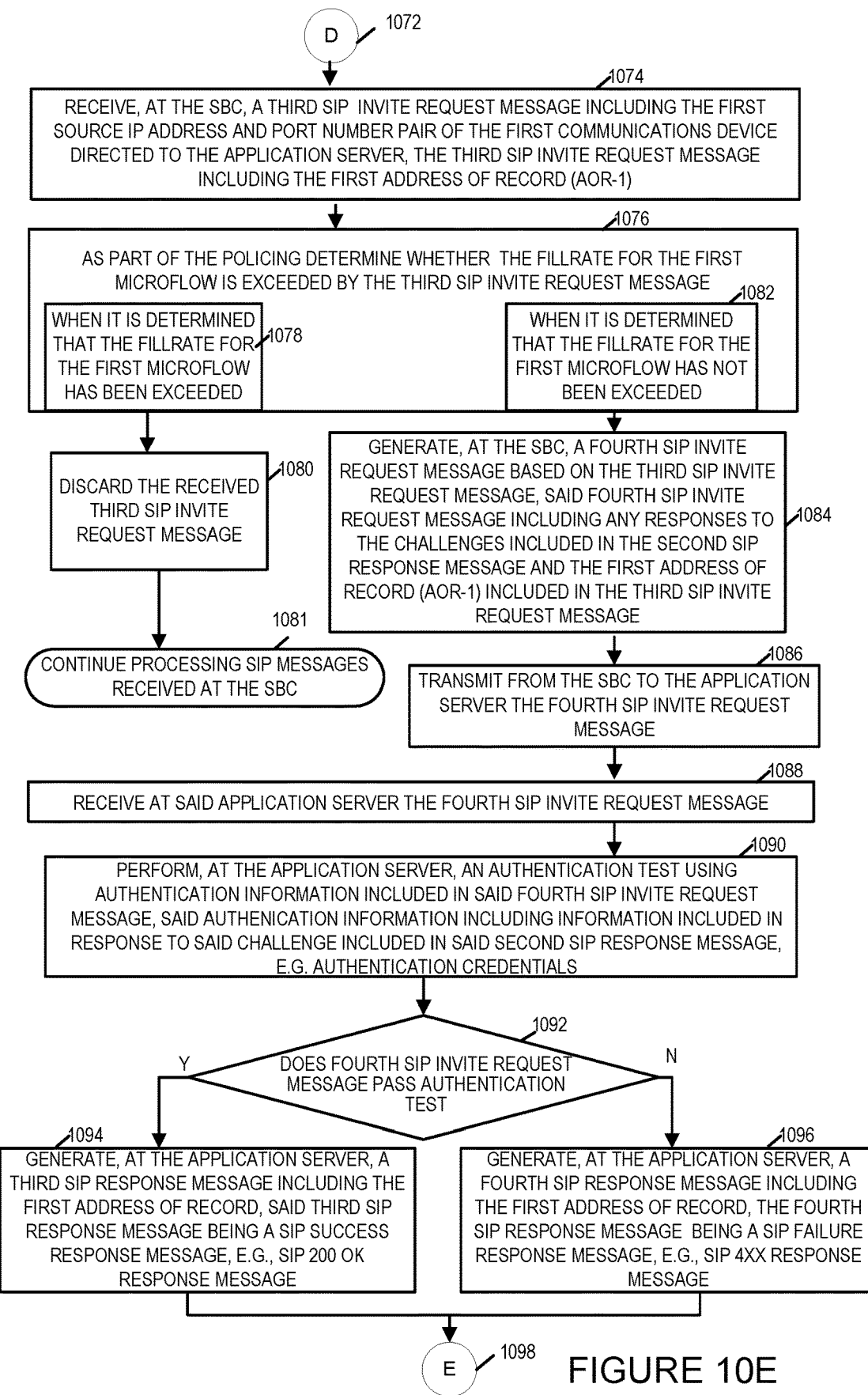
FIG. 10E illustrates a fifth part of a flowchart showing the steps of an exemplary communications method in accordance with one embodiment of the present invention.
Figure 10F:
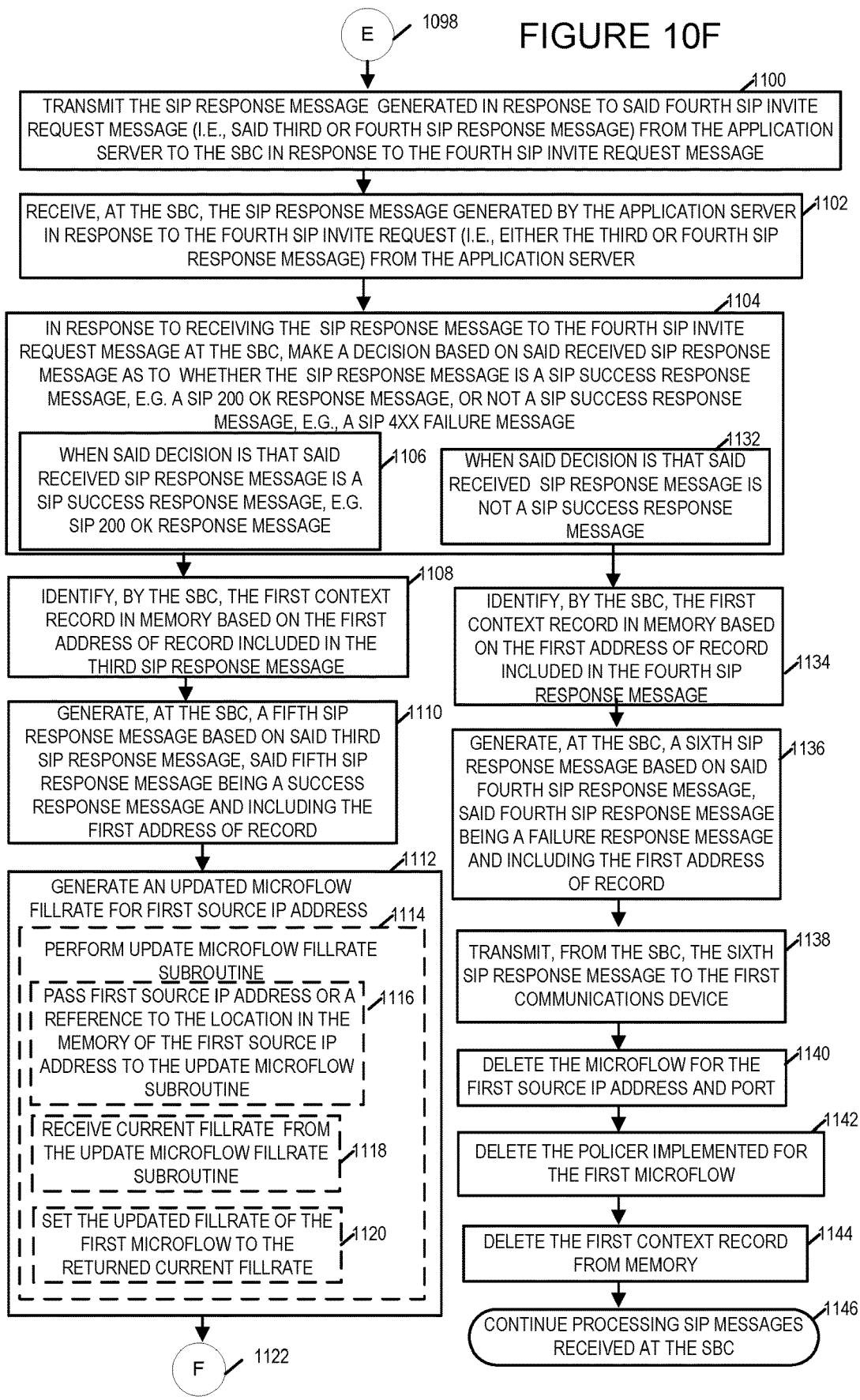
FIG. 10F illustrates a sixth part of a flowchart showing the steps of an exemplary communications method in accordance with one embodiment of the present invention.
Figure 10H:
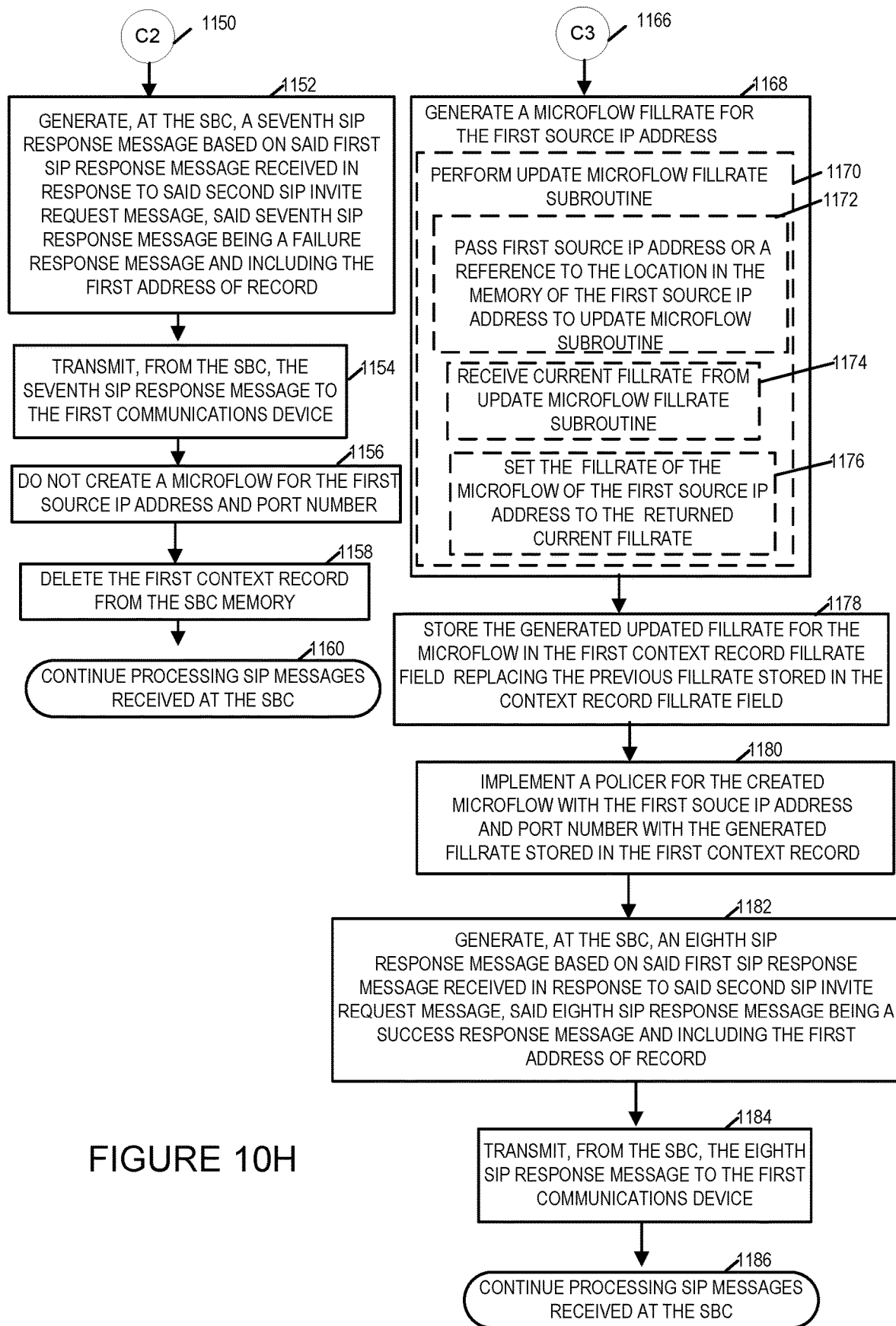
FIG. 10H illustrates an eighth part of a flowchart showing the steps of an exemplary communications method in accordance with one embodiment of the present invention.
Figure 10I:
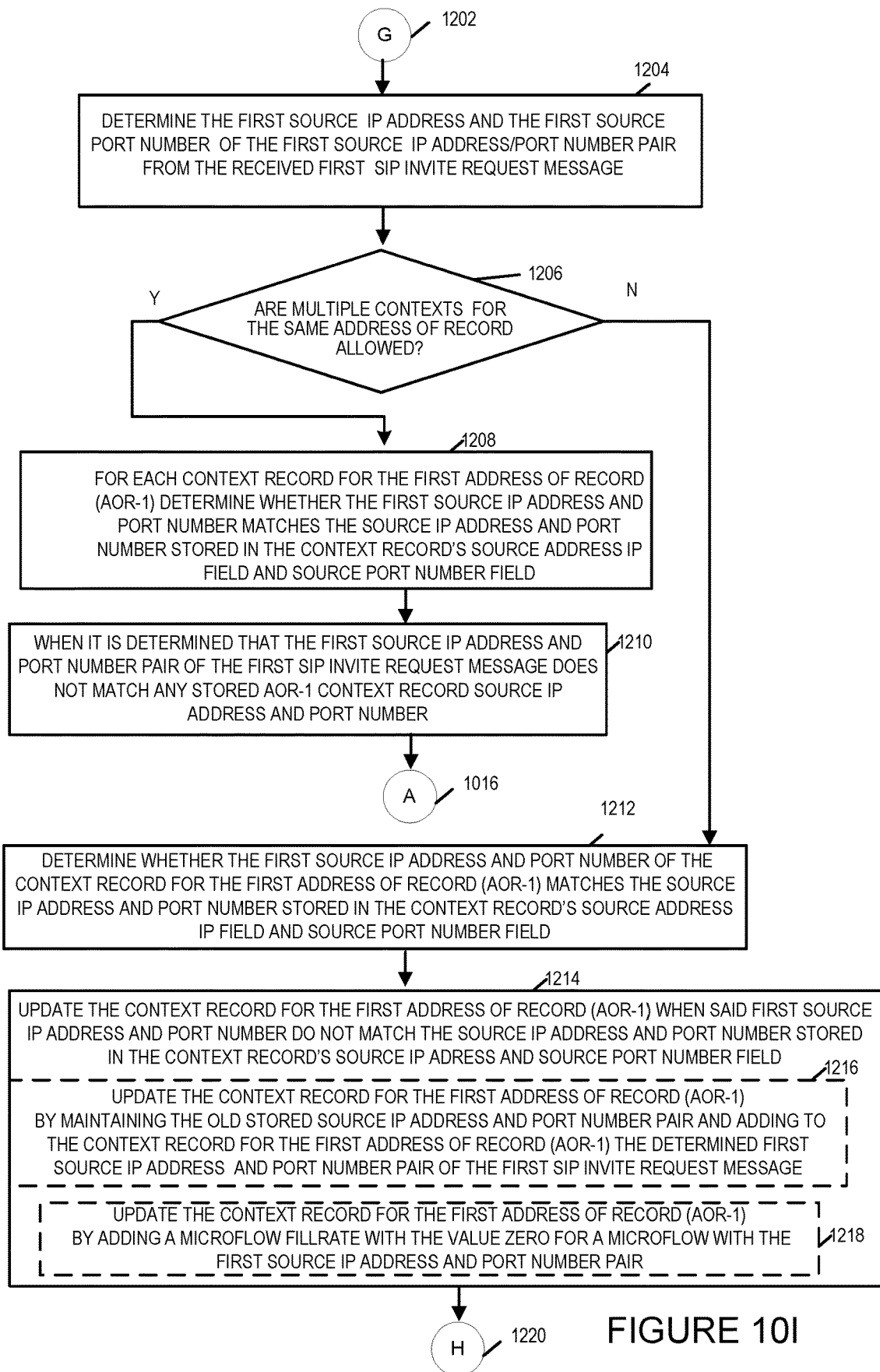
FIG. 10I illustrates a ninth part of a flowchart showing the steps of an exemplary communications method in accordance with one embodiment of the present invention.

FIG. 10 illustrates the combination of FIGS. 10A, 10B, 10C, 10D, 10E, 10F, 10G, 10H, and 10I. FIG. 10A illustrates a first part of a flowchart showing the steps of an exemplary communications method in accordance with one embodiment of the present invention. FIG. 10B illustrates a second part of a flowchart showing the steps of an exemplary communications method in accordance with one embodiment of the present invention. FIG. 10C illustrates a third part of a flowchart showing the steps of an exemplary communications method in accordance with one embodiment of the present invention. FIG. 10D illustrates a fourth part of a flowchart showing the steps of an exemplary communications method in accordance with one embodiment of the present invention. FIG. 10E illustrates a fifth part of a flowchart showing the steps of an exemplary communications method in accordance with one embodiment of the present invention. FIG. 10F illustrates a sixth part of a flowchart showing the steps of an exemplary communications method in accordance with one embodiment of the present invention. FIG. 10G illustrates a seventh part of a flowchart showing the steps of an exemplary communications method in accordance with one embodiment of the present invention. FIG. 10H illustrates an eighth part of a flowchart showing the steps of an exemplary communications method in accordance with one embodiment of the present invention. FIG. 10I illustrates a ninth part of a flowchart showing the steps of an exemplary communications method in accordance with one embodiment of the present invention.

Another more detailed exemplary communications method 1000 that provides efficient packet flow fillrate adjustment for distributed denial of service protection and minimizes overallocation of resources (e.g., bandwidth, packet processing capability) to individual packet flows/microflows is illustrated in FIG. 10. In FIG. 10, the exemplary method 1000 may be, and typically is, implemented using exemplary system 100 or system 200 of FIGS. 1 and 2 respectively. The method describes the operation of the SBC 106 in the system 100 or 200 and the SIP application server 108. In some embodiments, one or more of the steps of the method are stored as software instructions in a control routine component stored in the memory 310 of the SBC 106 which when executed by the processor 306 control the SBC to perform the operation described in one or more of the steps of the method 1000. Similarly, one or more of the steps of the method are stored as software instructions in a control routine component stored in the memory 610 of the SIP application server 108 which when executed by the processor 606 control the SIP application server to perform the operation described in one or more of the steps of the method 1000

The method 1000 will now be explained in connection with the steps of the flowchart illustrated in FIG. 10. Operation begins in start step 1002 shown on FIG. 10A. Operation proceeds from step 1002 to step 1004.

In step 1004, a first Session Initiation Protocol (SIP) INVITE request message is received at a Session Border Controller (e.g., SBC 106) over a first communications channel including a first source IP address and port number pair of a first communications device (e.g., NAT device 122) directed to an application server (e.g., SIP Application Server/SIP Registrar 108). One of the receivers of one of the I/O interfaces of the SBC receives the SIP INVITE protocol message. The first SIP INVITE request message also includes a first Address of Record (AOR-1). The SBC determines that the first SIP INVITE message first source IP address is a public IP address. The SBC in some embodiments makes a determination that the first communications device is a NAT device. In some embodiments, the SBC makes the determination that the first communications device is a NAT device based on the first source IP address included in the first SIP INVITE request message. Operation proceeds from step 1004 to step 1006.

In step 1006, the SBC determines from the first SIP INVITE request message the first Address of Record (AoR-1) included in the first SIP INVITE request message. Operation proceeds from step 1006 to step 1008.

In step 1008, the SBC determines whether a context record exists for the determined first Address of Record (AOR-1). While the method 1000 discusses the use of a context record a context object may also be used. The context record or object contains information about the connection being initiated including for example state information. The context record or object is sometimes simply referred to as a context herein. Step 1008 may, and sometimes does, include one or more of sub-steps 1010, 1012, 1014, 1015 and 1200.

In sub-step 1010, the SBC is operated to compare the determined first Address of Record (AoR-1) from the received first SIP INVITE request message to the Address of Record information included in context records stored in SBC memory.

In sub-step 1012, the SBC is operated to determine that a context record for the first address of record (AoR-1) exists when a match is found during said comparison of the first address of record (AoR-1) to the address of record information included in said context records stored in said SBC memory.

In sub-step 1014, the SBC is operated to determine that a context record for the first address of record (AoR-1) does not exist when a match is not found during said comparison of the first address of record (AoR-1) to the address of record information included in said context records stored in said SBC memory.

In sub-step 1015 when a context record for the first address of record (AoR-1) is determined not to exist operation proceeds from step 1008 via connection node A 1016 to step 1018 shown on FIG. 10B.

In step 1018, the SBC is operated to generate a first context record for the first address of record (AoR-1). The first context record including fields for an identifier, an Internet Protocol (IP) address, a port number, and a packet microflow fillrate. Operation proceeds from step 1018 to step 1020.

In step 1020, the SBC is operated to determine the first source IP address and the first source port number from the received first SIP INVITE request message. Operation proceeds from step 1020 to step 1022.

In step 1022, the SBC is operated to store the determined first address of record in the identifier field of the generated first context record. Operation proceeds from step 1022 to step 1024.

In step 1024, the SBC is operated to store the determined first source IP address in the Internet Protocol address filed of the generated first context record. Operation proceeds from step 1024 to step 1026.

In step 1026, the SBC is operated to store the first source port number in the port number field of the generated first context record. Operation proceeds from step 1026 to step 1028.

In step 1028, the SBC is operated to store the value of zero in the microflow packet fillrate field for the first context record. Operation proceeds from step 1028 to step 1030.

In step 1030, the SBC is operated to generate a second SIP INVITE request message based upon the first SIP INVITE request message. The second SIP INVITE request message including the first address of record (AoR-1). Operation proceeds from step 1030 to step 1032.

In step 1032, the SBC via one of its I/O interface transmitters transmits from the SBC the generated second SIP INVITE request message to the SIP Application Server (e.g., SIP Application Server 108). Operation proceeds from step 1032 to step 1034.

In step 1034, the Application Server receives via one of its I/O interface receivers the second SIP INVITE request message transmitted from the SBC. Operation proceeds from step 1034 to step 1036.

In step 1036, the Application Server is operated to determine a first SIP response message to send to the SBC in response to and based on the second SIP INVITE request message. For example, a SIP success response message such as a SIP 200 or 200 OK response message or a SIP failure response message such as a SIP 401 unauthorized response message, a SIP 407 proxy authentication required response message or another SIP 4XX client failure response message. The first SIP response message includes the first address of record (AoR-1) so that the SBC can identify which SIP INVITE request message to which it corresponds. Operation proceeds from step 1036 via connection node B 1038 to step 1040 shown on FIG. 10C.

In step 1040, the SIP Application Server is operated to generate the first SIP response message including the first address of record (AoR-1) to send to the SBC in response to the second SIP INVITE request message, e.g., a SIP success response message such as a SIP 200 or SIP 200 OK message or a SIP failure response message such as a SIP 401 unathorized response message including a WWW-AUTHENTICATE HEADER FIELD containing one or more challenges, a SIP 407 proxy authentication required response message including a PROXY-AUTHENTICATE HEADER FIELD containing one or more challenges or another SIP 4XX client failure response message. Operation proceeds from step 1040 to step 1042.

In step 1042, the SIP Application is operated to transmit the generated first SIP response message from the application server to the SBC in response to the second SIP INVITE request message using one its I/O interface transmitters. Operation proceeds from step 1042 to step 1044.

In step 1044, the SBC is operated to receive by one of its I/O interface receivers the first SIP response message in response to the second SIP INVITE request message from the SIP Application Server. Operation proceeds from step 1044 to step 1046.

In step 1046, in response to receiving the first SIP response message at the SBC, the SBC is operated to make a decision based on the first SIP response message as to whether the first SIP response message is a SIP success response message, e.g., SIP 200 OK response message, or not a SIP success response message. In sub-step 1048, when the decision is that the first SIP response message is not a SIP success response message operation proceeds from step 1046 to step 1050. In sub-step 1162, when the decision is that said first SIP response message is a SIP success response message, e.g., a SIP 200 OK response message operation proceeds from step 1146 to step 1164. In addition in subset 1162, if only one context record for the same address of record is allowed and the context record for the first address of record includes both an old source IP address and port number and the first source IP address and port number, then the SBC is operated to delete the old source IP address and port number and the microflow fillrate corresponding to the old source IP address and port number from the context record for the first address of record. In such cases in sub-set 1162, the SBC is also operated to delete the microflow corresponding to the first address of record and the old source IP address and port number and the policer implemented to police the microflow corresponding to the first address or record and the old source IP address and port number.

In decision step 1050, the SBC is operated to determine if said first SIP response message is a SIP 401 unauthorized response message including a WWW-AUTHENTICATE HEADER FIELD containing one or more challenges or a SIP 407 PROXY AUTHENTICATION REQUIRED MESSAGE including a PROXY-AUTHENTICATE HEADER FIELD containing one or more challenges. Step 1050 includes sub-steps 1051 and 1148. In sub-step 1051, when the first SIP response message is determined by the SBC to be a SIP 401 or SIP 407 response message operation proceeds from step 1051 via connection node C1 1052 to step 1053 shown on FIG. 10D.

In step 1053, the SBC is operated to create a first microflow for the first source IP address and port number pair. Operation proceeds from step 1053 to step 1054.

In step 1054, the SBC is operated to set a packet flow fillrate for the first microflow to a first fillrate value, the first fillrate value being zero. While the first fillrate value is zero, the policer that is implemented for the first source IP address and port number accommodates the passage of a subsequent SIP INVITE request message with credential information, e.g., the policer may be implemented as a token bucket policer with a bucket size that allows passage of packets included in messages necessary to keep NAT bindings open and a subsequent SIP INVITE request message with credentials. For example in some embodiments, the policer's bucket size allows passage of 3 or 5 packets even when the fillrate is set to zero. Operation proceeds from step 1054 to step 1058.

In step 1058, the SBC is operated to store the fillrate for first microflow in the first context record fillrate field. Operation proceeds from step 1060 to step 1060.

In step 1060, the SBC is operated to implement a packet policer that blocks packets, and therein SIP messages, from the first source IP address and port number pair when the policer's packet flow restrictions which are best on the fillrate for for the first microflow are exceeded. In most but not all embodiments, the packet policer is a token bucket policer and the policer's packet flow are based on policer's bucket size and fillrate. The bucket size of the policer being selected to accommodate at least a small number of packets, e.g., 5 packets, when the fillrate is set to zero so that a subsequent SIP INVITE message will authentication credentials can pass through the policer when the fillrate for the policer is set to zero. Operation proceeds from step 1060 to step 1062.

In step 1062, the SBC is operated to generate at the SBC a second SIP response message based on said first SIP response message. The second SIP response message includes the first address of record (AoR-1). In some embodiments step 1062 includes one or more of sub-steps 1064, 1066, and 1068. In sub-step 1064, the SBC is operated to determine the type of the first SIP response message received. In sub-step 1066, when the first SIP response message is a SIP 401 unauthorized response message type, the SBC is operated to generate the second SIP response message wherein the second SIP response message is a SIP 401 unauthorized response message including a WWW-AUTHENTICATE HEADER FIELD containing the same one or more challenges as included in the first SIP response message. In sub-step 1068, when the first SIP response message is determined to be a SIP 407 PROXY AUTHENTICATION REQUIRED response message type, the SBC is operated to generate the second SIP response message wherein the second SIP response message is a SIP 407 PROXY AUTHENTICATION REQUIRED response message including a PROXY-AUTHENTICATE HEADER FIELD containing the same one or more challenges included in the first SIP response message. Operation proceeds from step 1062 to step 1070.

In step 1070, the SBC is operated to transmit the second SIP response message to the first communications device in response to the first SIP INVITE request message. Operation proceeds from step 1070 via connection node D 1072 to step 1074 shown on FIG. 10E.

In step 1074, the SBC receives a third SIP INVITE request message including the first source IP address and port number pair of the first communications device directed to the application server. The third SIP INVITE request message includes the first address of record (AoR-1). Operation proceeds from step 1074 to step 1076.

In step 1076 as part of the policing, the SBC is operated to determine whether the packet flow fillrate for the first microflow is exceeded by the packets of the third SIP INVITE request message. Step 1076 includes sub-steps 1078 and 1082. In sub-step 1078 when it is determined that the fillrate for the first microflow has been exceeded operation proceeds from step 1076 to step 1080. In step 1080, the SBC is operated to discard the received third SIP INVITE request message which includes packets exceeding the packet flow fillrate for the first microflow. This may be, and sometimes is, the result of a distributed denial of service attack wherein a number of message including packets have been sent to the SBC which include the first source IP address and port number as part of a distributed denial of service attack. Operation proceeds from step 1080 to step 1081.

In step 1081, the method 1000 continues with the processing of additional SIP messages as they are received at the SBC.

In sub-step 1082, when the SBC determines that the packet flow fillrate for the first microflow has not been exceeded, e.g., when the SBC is not under a distributed denial of service attack, operation proceeds from step 1076 to step 1084.

In step 1084, the SBC is operated to generate a fourth SIP INVITE request message based on the third SIP INVITE request message. The fourth SIP INVITE request message is generated so as to include any response to the challenges included in the second SIP response message and the first address of record (AoR-1) included in the third SIP INVITE request message. Operation proceeds from step 1084 to step 1086.

In step 1086, the SBC is operated to transmit the generated fourth SIP INVITE request message from the SBC to the SIP application server. Operation proceeds from step 1086 to step 1088.

In step 1088, the Application Server is operated to receive the fourth SIP INVITE request message. Operation proceeds from step 1088 to step 1090.

In step 1090, the Application Server is operated to perform an authentication test using the authentication information included in the fourth SIP INVITE request message, the authentication information including information included in the response to the one or more challenges included in the second SIP response message, e.g., authentication credentials provided in response to one or more authentication challenges. Operation proceeds from step 1090 to decision step 1092.

In decision step 1092, the SIP application server decides whether the fourth SIP INVITE request message passed the authentication test or not. When the decision is that the authentication test was passed operation proceeds to step 1094 and when the decision is that the authentication test was not passed operation proceeds to step 1096.

In step 1094, the Application Server is operated to generate a SIP response message in response to the fourth SIP INVITE request message, the generated SIP response message being a third SIP response message including the first address of record (AoR-1), the third SIP response message being a SIP success response, e.g., a SIP 200 or SIP 200 OK response message. Operation proceeds from step 1094 via connection node E 1098 to step 1100 shown on FIG. 10F.

In step 1096, the Application Server is operated to generate a SIP response message in response to the fourth SIP INVITE request message, the generated SIP response message being a fourth SIP response message including the first address of record (AoR-1) and being a SIP failure response message, e.g., a SIP 4XX response message. Operation proceeds from step 1096 via connection node E 1098 to step 1100 shown on FIG. 10F.

In step 1100, the SIP application server transmits the SIP response message generated in step 1094 or 1096 in response to the fourth SIP INVITE request message from the application server to the SBC in response to the fourth SIP INVITE request message. Operation proceeds from step 1100 to step 1102.

In step 1102, the SBC is operated to receive the SIP response message sent in response to the fourth SIP INVITE request message from the SIP application server. Operation proceeds from step 1102 to step 1104.

In step 1104, in response to receiving the SIP response message to the fourth SIP INVITE request message at the SBC, the SBC is operated to make a decision based on the received SIP response message as to whether the received SIP response message is a SIP success response message, e.g., a SIP 200 or SIP 200 OK message or not a SIP success response message, e.g., a SIP 4XX failure response message. Step 1104 includes sub-steps 1106 and 1132.

In sub-step 1106, when the decision is that said received SIP response message is a SIP response message, e.g., SIP 200 OK response message, operation proceeds from step 1104 to step 1108. In sub-step 1132, when the decision is that said received SIP response message is not a SIP success response message operation proceeds from step 1104 to step 1134. In addition in subset 1106, if only one context record for the same address of record is allowed and the context record for the first address of record includes both an old source IP address and port number and the first source IP address and port number, then the SBC is operated to delete the old source IP address and port number and the microflow fillrate corresponding to the old source IP address and port number from the context record for the first address of record. In such cases in sub-set 1106, the SBC is also operated to delete the microflow corresponding to the first address of record and the old source IP address and port number and the policer implemented to police the microflow corresponding to the first address or record and the old source IP address and port number.

In step 1108, the SBC is operated to identify the first context record in memory based on the first address of record included in the third response message. Operation proceeds from step 1108 to step 1110.

In step 1110, the SBC is operated to generate a fifth SIP response message based on said third SIP response message, the fifth SIP response message being a SIP success response message including the first address of record (AOR-1). Operation proceeds from step 1110 to step 1112.

In step 1112, the SBC is operated to generate an updated microflow packet fillrate for the first source IP address, said updated microflow packet fillrate being a second packet fillrate value which is greater than said first packet fillrate value. In some embodiments, step 1112 includes sub-step 1114. In sub-step 1114, the SBC performs an update microflow fillrate subroutine such as for example, the routine 3000 illustrated in FIG. 11 and which is discussed in further detail below. In some embodiments, sub-step 1114 includes one or more sub-steps 1116, 1118 and 1120.

In sub-step 1116, the first source IP address or a reference to the location in the SBC memory where the first source IP address is stored is passed to the update microflow subroutine. In sub-step 1118, the current fillrate from the update microflow fillrate subroutine is returned/received. In sub-step 1120, the updated fillrate of the first microflow is set to the returned current fillrate. The second packet fillrate value is set to be equal to the returned current fillrate. Operation proceeds from step 1112 via connection node F 1122 to step 1124 shown on FIG. 10G.

In step 1124, the SBC is operated to store the generated updated fillrate for the first microflow in the first context record fillrate filed replacing the previous packet flow fillrate stored in the first context record fillrate field. Operation proceeds from step 1124 to step 1126.

In step 1126, the SBC is operated to update the policer with the fillrate for the first microflow in the first context record fillrate field replacing the previous fillrate used by said policer. Operation proceeds from step 1126 to step 1128.

In step 1128, the SBC is operated to transmit from the SBC to the fifth SIP response message to the first communications device. Operation proceeds from step 1128 to step 1130.

In step 1130, the method 1000 continues with the processing of additional SIP messages as they are received at the SBC.

Returning to step 1134 shown on FIG. 10F, when said decision in step 1104 is that said received SIP response message is not a SIP success response message, the SBC is operated to identify the first context record in memory based on the first address of record included in the fourth SIP response message. Operation proceeds from step 1134 to step 1136.

In step 1136 the SBC is operated to generate a sixth SIP response message based on said fourth SIP response message, the fourth SIP response message being a failure response message and including the first address of record (AoR-1). Operation proceeds from step 1136 to step 1138.

In step 1138, the SBC is operated to transmit from the SBC the sixth SIP response message to the first communications device. Operation proceeds from step 1138 to step 1140.

In step 1140, the SBC is operated to delete the microflow for the first source IP address and port, i.e., the first microflow. Operation proceeds from step 1140 to step 1142.

In step 1142, the SBC is operated to delete the policer implemented for the first microflow. Operation proceeds from step 1142 to step 1144.

In step 1144, the SBC is operated to delete the first context record from memory unless if only one context record for the same address of record is allowed and the context record for the first address of record includes both an old source IP address and port number and the first source IP address and port number, then the SBC is operated to delete the first source IP address and port number and the microflow fillrate corresponding to the first source IP address and port number from the first context record for the first address of record but maintains the old source IP address and port number and microflow fillrate corresponding to the old source IP address and port number.

Operation proceeds from step 1144 to step 1146.

In step 1146, the method 1000 continues with the processing of additional SIP messages as they are received at the SBC.

Returning now to decision step 1050 and sub-step 1148. In sub-step 1148 of step 1050, when the first SIP response message is determined by the SBC not to be the SIP 401 or SIP 407 response message operation proceeds from step 1050 via connection node C2 1150 to step 1152 shown on FIG. 10H.

In step 1152, the SBC is operated to generate a seventh SIP response message based on said first SIP response message received in response to said second SIP INVITE request message, said seventh SIP response message being a failure response message and including the first address of record (AoR-1). Operation proceeds from step 1152 to step 1154.

In step 1154, the SBC is operated to transmit from the SBC the seventh SIP response message to the first communications device. Operation proceeds from step 1154 to step 1156.

In step 1156, the SBC does not create a microflow for the first source IP address and port number. Operation proceeds from step 1156 to step 1158.

In step 1158, the SBC is operated to delete the first context record from the SBC memory, unless if only one context record for the same address of record is allowed and the first context record for the first address of record includes both an old source IP address and port number and the first source IP address and port number, then the SBC is operated to delete the first source IP address and port number and the microflow fillrate corresponding to the first source IP address and port number from the first context record for the first address of record but maintains the old source IP address and port number and microflow fillrate corresponding to the old source IP address and port number. Operation proceeds from step 1158 to step 1160.

In step 1160, the method 1000 continues with the processing of additional SIP messages as they are received at the SBC.

Returning now to decision step 1040 and sub-step 1162. In sub-step 1162 of step 1040, when the first SIP response message is determined by the SBC to be a SIP success response message, e.g., a SIP 200 or SIP 200 OK message response message operation proceeds from step 1040 to step 1164.

In step 1164, the SBC is operated to create a microflow for the first source IP address and port number. Operation proceeds from step 1164 via connection node C3 1166 to step 1168 shown on FIG. 10H.

In step 1168, the SBC is operated to generate a microflow fillrate for the first source IP address. In some embodiments, step 1168 includes sub-step 1170. In sub-step 1170 the SBC is operated to perform an update microflow fillrate subroutine such as for example sub-routine 1300 illustrated in FIG. 11. In some embodiments sub-step 1170 includes one or more sub-steps 1172, 1174 and 1176. In sub-step 1172 the first source IP address or a reference to the location in memory in which the first source IP address is stored is passed to the update microflow subroutine. In sub-step 1174, the current fillrate is received/returned from the update microflow fillrate subroutine. In step 1176, the fillrate for the microflow for the first source IP address and port number created in step 1164 to the returned/received current fillrate. Operation proceeds from step 1168 to step 1178.

In step 1178, the SBC is operated to store the generated updated fillrate for the microflow for the first source IP address created in step 1164 in the first context record fillrate field replacing the previous fillrate stored in the context record fillrate field. Operation proceeds from step 1178 to step 1180.

In step 1180, the SBC implements a policer for the microflow for the first source IP address created in step 1164 with the generated fillrate stored in the first context record. Operation proceeds from step 1180 to step 1182.

In step 1182, the SBC is operated to generate an eighth SIP response message based on said first SIP response message received in response to said second SIP INVITE request message, said eighth SIP response message being a success response message and including the first address of record (AoR-1). Operation proceeds from step 1182 to step 1184.

In step 1184, the SBC transmits the eighth SIP response message to the first communications device. Operation proceeds from step 1184 to step 1186.

In step 1186, the method 1000 continues with the processing of additional SIP messages as they are received at the SBC.

Returning on to step decision step 1008 shown on FIG. 10A, when in sub-step 1200 a context record for the first address of record (AoR-1) is determined to exist by the SBC operation proceeds from step 1008 via connection node G 1202 to step 1204 shown on FIG. 10I.

In step 1204, the SBC is operated to determine the first source IP address and the first source port number of the first source IP address/port number pair from the received first SIP INVITE request message. Operation proceeds from step 1204 to decision step 1206.

In decision step 1206, the SBC is operated to make a decision as to whether there are multiple contexts for the same address of record allowed and when the decision is yes then operation proceeds to step 1208 from step 1206 otherwise operation proceeds to step 1212.

In step 1208, for each context record for the first address of record (AoR-1) the SBC determines whether the first source IP address and port number pair matches the source IP address and port number stored in the context record's source address IP field and source port number field. Operation proceeds from step 1208 to step 1210.

In step 1210 when it is determined by the SBC that the first source IP address and port number pair of the first SIP INVITE request message do not match any stored AoR-1 context record source IP address and port number operation proceeds from step 1210 via connection node 1016 to step 1018 where the SBC generates a first context record as previously described. Operation then proceeds from step 1018 as previously discussed above. In some embodiments instead of generating a new context record a list of source IP/port pairs are maintained in the same AoR-1 context when multiple source IP address and port number pairs are allowed for the same address of record.

When in step 1206 the decision is that the multiple contexts for the same address of record is not allowed operation proceeds to step 1212. In step 1212, a determination is made by the SBC as to whether the first source IP address and port number of the context record for the first address of record (AoR-1) matches the source IP address and port number stored in the context record's source address IP field and source port number field. Operation proceeds from step 1212 to step 1214.

In step 1214, the SBC is operated to update the context record for the first address of record (AOR-1) when said first source IP address and port number do not match the source IP address and port number stored in the context record's source IP address and source port number field. In some embodiments, step 1214 includes sub-steps 1216 and 1218.

In sub-step 1216, the SBC updates the context record for the first address of record (AoR-1) by maintaining the old stored source IP address and port number pair and adding to the context record for the first address of record (AoR-1) the determined first source IP address and port number pair of the first SIP INVITE request message.

In sub-step 1218, the SBC updates the context record for the first address of record (AoR-1) by adding a microflow fillrate with the first fillrate value which is zero for a microflow with the first source IP address and port number pair. Operation proceeds from step 1214 via connection node H 1220 to step 1030. In step 1030, as previously described the SBC is operated to generate a second SIP INVITE request message. Operation proceeds from step 1030 as previously described.

Figures 11, 11B:
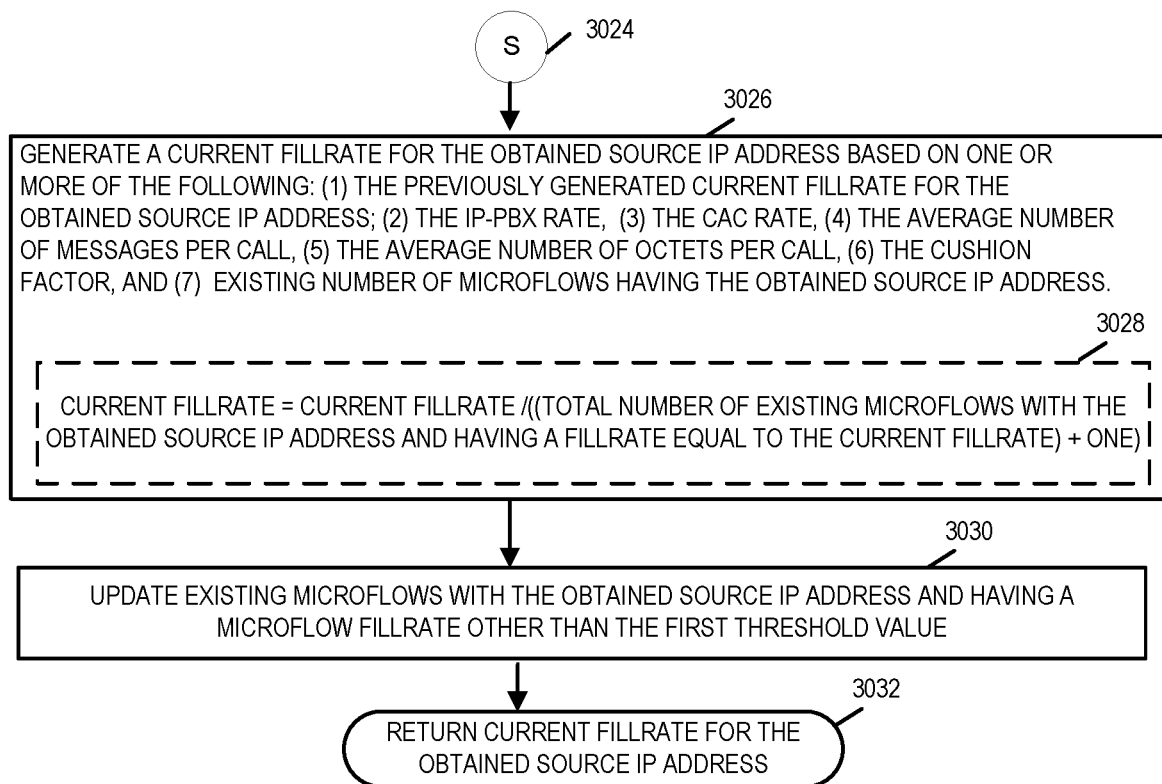
FIG. 11 illustrates the combination of FIGS. 11A, 11B, and 11C.
FIG. 11B illustrates a second part of a flowchart showing the steps of the exemplary method/routine of updating a microflow packet fillrate in accordance with one embodiment of the present invention.
Figure 11A:
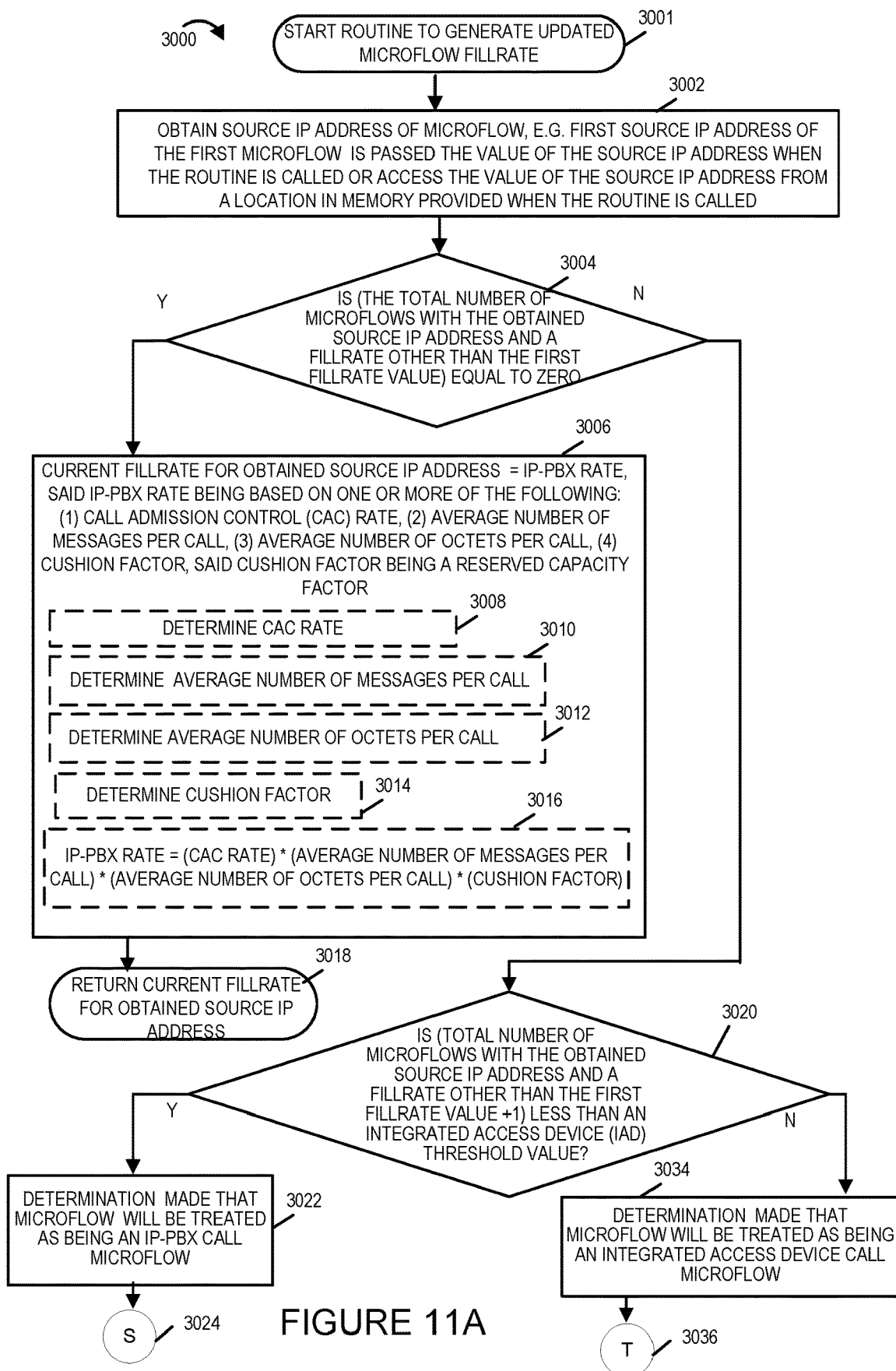
FIG. 11A illustrates a first part of a flowchart showing the steps of an exemplary method/routine of updating a microflow packet fillrate in accordance with one embodiment of the present invention.
Figure 11C:
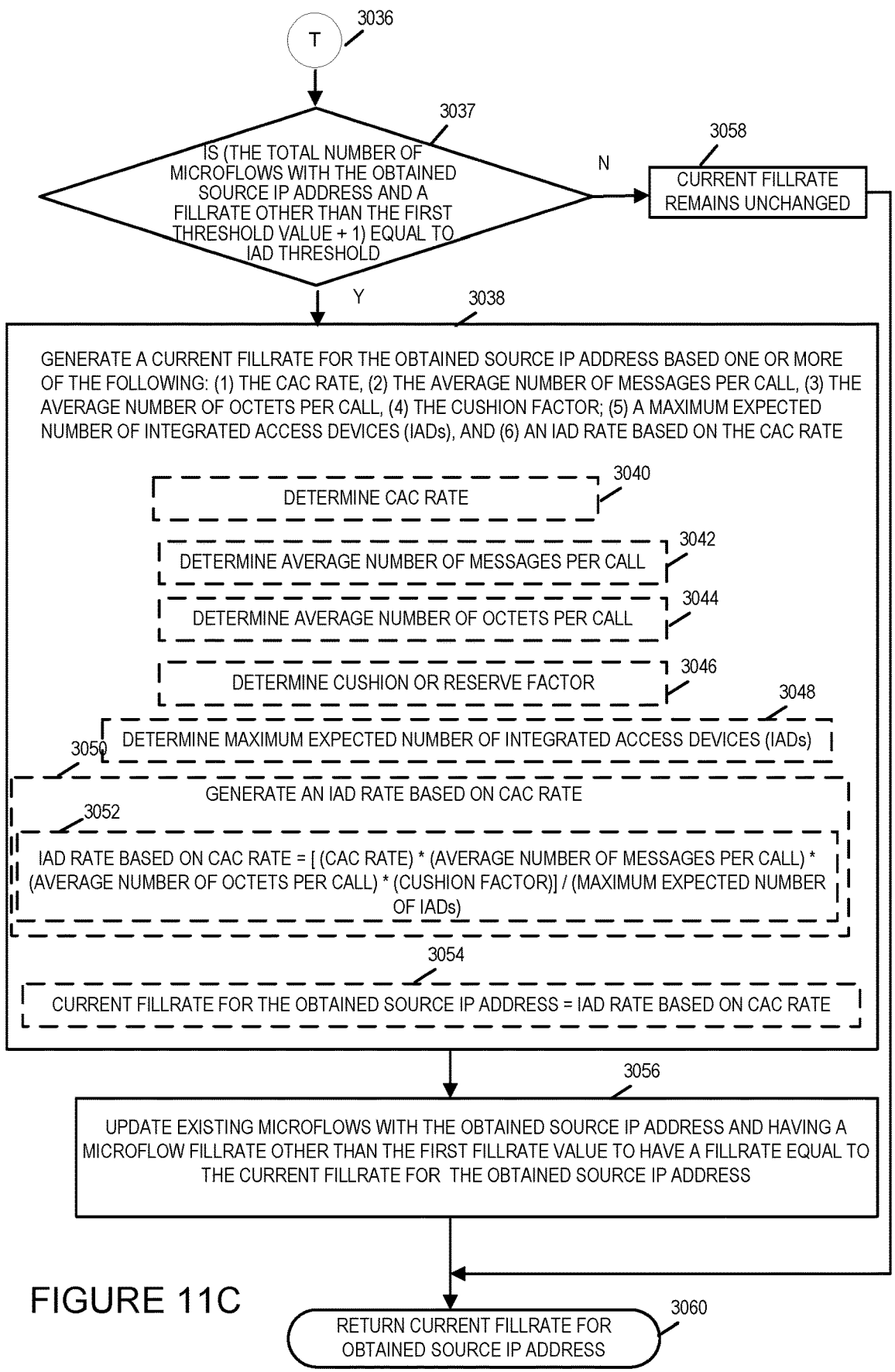
FIG. 11C illustrates a third part of a flowchart showing the steps of the exemplary method/routine of updating a microflow packet fillrate in accordance with one embodiment of the present invention.

FIG. 11 comprises FIGS. 11A, 11B, and 11C. FIG. 11A illustrates a first part of a flowchart showing the steps of an exemplary method/routine 3000 of updating a microflow packet fillrate in accordance with one embodiment of the present invention. FIG. 11B illustrates a second part of a flowchart showing the steps of an exemplary method/routine of updating a microflow packet fillrate in accordance with one embodiment of the present invention. FIG. 11C illustrates a third part of a flowchart showing the steps of an exemplary method/routine of updating a microflow packet fillrate in accordance with one embodiment of the present invention. The method/routine 3000 may be, implemented by a SBC such as SBC 106 of FIGS. 1 and 2.

The method/routine 3000 to generate updated microflow packet flow fillrate starts in start step 3001. Operation proceeds from start step 3001 to step 3002.

In step 3002, the source IP address of the microflow to be updated is obtained by the component executing the routine, e.g., the first source IP address of the first microflow is passed to the routine as a value when the routine is called or the component executing the routine obtains the source IP address from a location in memory that is provided when the routine is called. Operation proceeds from step 3002 to decision step 3004.

In decision step 3004, a decision is made as to whether (the total number of microflows with the obtained source IP address and a fillrate other than the first packet fillrate value) is equal to zero. Microflows with the fillrate having the first packet fillrate value are those that have not yet been authenticated or have been authenticated but have not yet had their fillrate updated. For these microflow the fillrate is to be keep to zero until there authentication is complete and their fillrates updated to a second packet fillrate value which is an IP-PBX packet flow fillrate or an IAD packet flow fillrate. When the decision in step 3004 is that the (total number of microflows with the obtained source IP address and a fillrate other than the first packet flow fillrate value) is equal to zero at the SBC (that is this is the first microflow on the source IP address) then operation proceeds to step 3006 otherwise operation proceeds to step 3020.

In step 3006, the SBC determines the current fillrate for the obtained source IP address to be an IP-PBX rate, the IP-PBX rate being based on one or more of the following: (1) a call admission control (CAC) rate, (2) an average number of message per call, (3) an average number of octets per call, and a cushion factor. The cushion factor being a reserved capacity factor. In some embodiments, the step 3006 includes one or more of the sub-steps 3008, 3010, 3012, 3014 and 3016. In sub-step 3008, the SBC is operated to determine a CAC rate. In sub-step 3010 the SBC is operated to determine an average number of messages per call. In sub-step 3012, the SBC is operated to determine an average number of octets per call. In sub-step 3014, the SBC is operated to determine a cushion or reserve factor. In sub-step 3016, the SBC is operated to generate an IP-PBX rate as a function of a CAC rate, e.g., the determined CAC rate, an average number of message per call, e.g., the determined average number of messages per call, an average number of octets per call, e.g., the determined number of octets per call, and a cushion factor, e.g., the determined cushion factor. In some embodiments, the IP-PBX rate is generated in accordance with the below equation.

IP-PBX rate=(CAC Rate)*(Average Number of Messages Per Call)*(Average Number of Octets Per Call)*(Cushion Factor)

Operation proceeds from step 3006 to return step 3018. In return step 3018, the current fillrate which is equal to the generated IP-PBX rate is returned to the routine that called the generate updated microflow fillrate routine.

Returning to decision step 3004, when the decision is that the total number of microflows with the obtained source IP address and a fillrate other than the first fillrate value is not equal to zero then operation proceeds from step 3004 to step 3020.

In decision step 3020, the SBC makes a decision as to whether the total number of microflows with the obtained source IP address is less than an Integrated Access Device (IAD) threshold value. When the total number of microflows with the obtained source IP address is less than the Integrated Access Device (IAD) threshold value, operation proceeds from decision step 3020 to step 3022 otherwise operation proceeds from decision step 3020 to step 3034.

In step 3022, the a determination is made by the SBC to treat the microflow for which the fillrate is being determined or updated as being an IP-PBX call microflow. Operation proceeds from step 3022 via connection node S 3024 to step 3026 shown on FIG. 11B.

In step 3026, the SBC is operated to generate a current fillrate for the obtained source IP address based on the one or more of the following: (1) a previously generated current fillrate for the obtained source IP address, (2) the IP-PBX rate previously calculated, (3) a CAC rate, (4) an average number of messages per call, (5) an average number of octets per call, (6) a cushion factor, and (7) an existing number of microflows at the SBC on having the obtained source IP address. In some embodiments, step 3026 includes one or more sub-steps to determine the CAC rate, the average number of messages per call, the average number of octets per call and the cushion similar to the sub-steps 3008, 3010, 3012, and 3014. In some embodiments, step 3026 includes a sub-step to determine the existing number of microflows having the obtained source IP address. In some embodiments, step 3026 includes sub-step 3028 in which the current fillrate is generated in accordance with the following equation.

Current Fillrate=Current Fillrate/((Total Number of Existing Microflows with the obtained source IP address and having a fillrate equal to the current fillrate)+one))

Operation proceeds from step 3026 to step 3030. In step 3030, the SBC updates the existing microflows with the obtained source IP address and having a microflow fillrate other than the first fillrate value to current fillrate generated in step 3026. Operation proceeds from step 3030 to step 3032. In step 3032, the current fillrate generated for the obtained source IP address by the routine 3000 is returned to the routine that called routine 3000.

Returning to decision step 3020, when the decision made is that the total number of microflows with the obtained source IP address is not less than an Integrated Access Device (IAD) threshold value operation proceeds from step 3020 to step 3034. In step 3034, the SBC makes a determination that the microflow for which the updated fillrate is to be generated is to be treated as being an integrated access device call microflow. Operation proceeds from step 3034 via connection node T 3036 to step 3037.

In decision step 3037, the SBC is operated to make a determination as to whether the total number of microflows with the obtained source IP address and a fillrate other than the first fillrate value+1 is equal to the IAD threshold value. When the decision is yes then operation proceeds from step 3037 to step 3038 and when the decision is no operation proceeds from step 3037 to step 3058.

In step 3038, the SBC is operated to generate a current fillrate for the obtained source IP address based on one or more of the following: (1) a CAC rate, (2) an average number of messages per call, (3) an average number of octets per call, (4) a cushion or reserve capacity factor, (5) a maximum expected number of integrated access devices (IADs) and (6) an IAD Rate based on CAC rate. In some embodiments, step 3038 includes one or more of sub-steps 3040, 3042, 3044, 3046, 3048, 3050 and 3054. In sub-step 3040, the SBC is operated to determine a CAC rate. In sub-step 3042, the SBC is operated to determine an average number of messages per call. In sub-step 3044, the SBC is operated to determine an average number of octets per call. In sub-step 3046, the SBC is operated to determine a cushion or reserve factor. In sub-step 3048, the SBC is operated to determine a maximum expected number of Integrated Access Devices (IADs) for example by retrieving the maximum expected number of IADs from a memory location wherein it is stored during configuration of the SBC. In sub-step 3050, the SBC is operated to generate an IAD Rate based on CAC rate. In some embodiments sub-step 3050 includes sub-step 3052. In sub-step 3052, the IAD Rate based on CAC rate is generated based on one or more of the following: (1) a CAC rate, (2) an average number of messages per call, (3) an average number of octets per call, (4) a cushion or reserve capacity factor, and (5) a maximum expected number of integrated access devices (IADs). In some embodiments, the IAD Rate based on CAC rate is generated in accordance with the following equation:

IAD Rate based on CAC Rate=[(CAC Rate)*Average Number of Messages Per Call)*(Average Number of Octets Per Call)*(Cushion Factor)]/(Maximum Expected Number of IADs)

In sub-step 3054, the SBC is operated to set the current fillrate for the obtained source IP address equal to the IAD Rate based on CAC rate. Operation proceeds from step 3038 to step 3056.

In step 3056, the SBC is operated to update existing microflows with the obtained source IP address and having a microflow fillrate other than the first fillrate value to have a fillrate equal to the generated current fillrate for the obtained source IP address. Operation proceeds from step 3056 to step 3060.

Returning to decision step 3037, when said decision is that the total number of microflows with the obtained source IP address and a fillrate other than the first fillrate value+1 is not equal to the IAD threshold value then operation proceeds to step 3058. In step 3058, it is determined that the current fillrate is not to modified that is it remains unchanged as the current fillrate was previously set to an IAD packet flow fillrate. That is the generated current flow fillrate is equal to the current flow fillrate unchanged and need not be redetermined. Operation proceeds from step 3058 to step 3060.

In step 3060, the current fillrate generated for the obtained source IP address by the routine 3000 is returned to the routine that called routine 3000.

Figure 12:
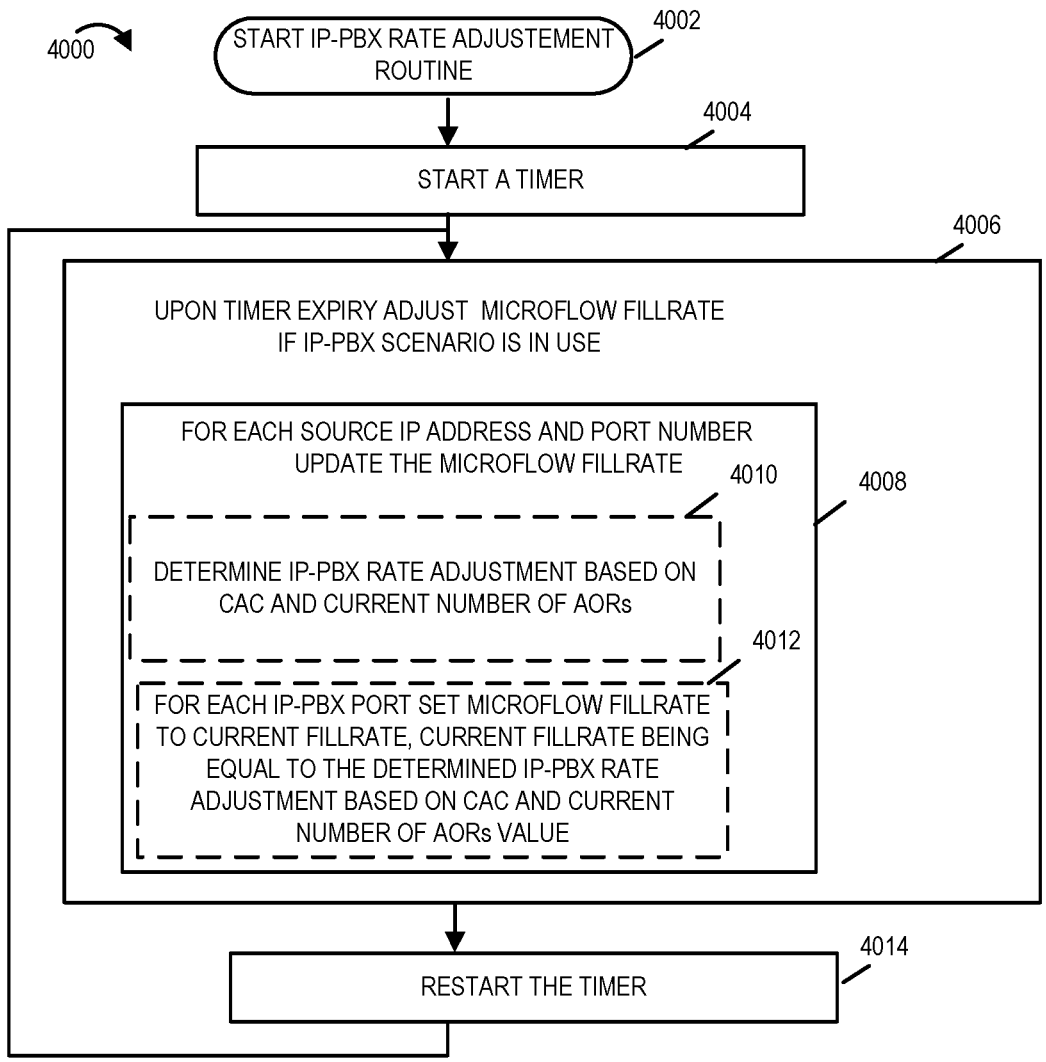
FIG. 12 illustrates an exemplary method of adjusting IP PBX microflow packet flow fillrates in accordance with an embodiment of the present invention.

FIG. 12 illustrates an exemplary method/routine 4000 of adjusting IP-PBX rates for microflows in accordance with one embodiment of the present invention. The IP-PBX Rate Adjustment method/routine 4000 starts in start step 4002. Operation proceeds from step 4002 to step 4004. In step 4004 a timer in the SBC is started. Operation proceeds from step 4004 to step 4006.

In step 4006, upon timer expiry, the SBC adjusts existing microflow fillrates if the IP-PBX scenario is in use. Step 4006 includes optional sub-step 4008.

In sub-step 4008, for each source IP address and port number, the SBC updates the microflow rate based on a CAC rate and the current number of AoRs. Sub-step 4008 includes optional sub-steps 4010 and 4012.

In sub-step 4010, the SBC is operated to determine an IP-PBX rate adjustment based on CAC and the current number of AoRs (that is current number of AoRs with a fillrate other than the first fillrate value of zero). In some embodiments, the IP-PBX rate is determined in accordance with the following equation:

IP-PBX rate adjustment based on CAC and current number of AoRs=(current number of AoRs on IP address/port)*[(CAC rate)*(average number of messages per call)*(average number of octets per call)*(cushion factor)]/(total number of current AoRs on IP)

In sub-step 4012, for each IP-PBX port (source IP address/port number pair) the SBC sets the microflow fillrate to the current fillrate, the current fillrate being set to the determined IP-PBX rate adjustment based on CAC and current number of AoRs value. Operation proceeds from step 4006 to step 4014 where the timer is restarted. Operation proceeds from step 4014 to step 4006 where microflow rates are once again updated when the timer expires assuming the IP-PBX scenario is still in use. In some embodiments, the timer is restarted immediately after expiration. In some embodiments, the routine 4000 is initiated when the SBC determines that a IP-PBX scenario is in use and is disabled when the SBC determines that an IAD scenario is in use.

Figure 13:
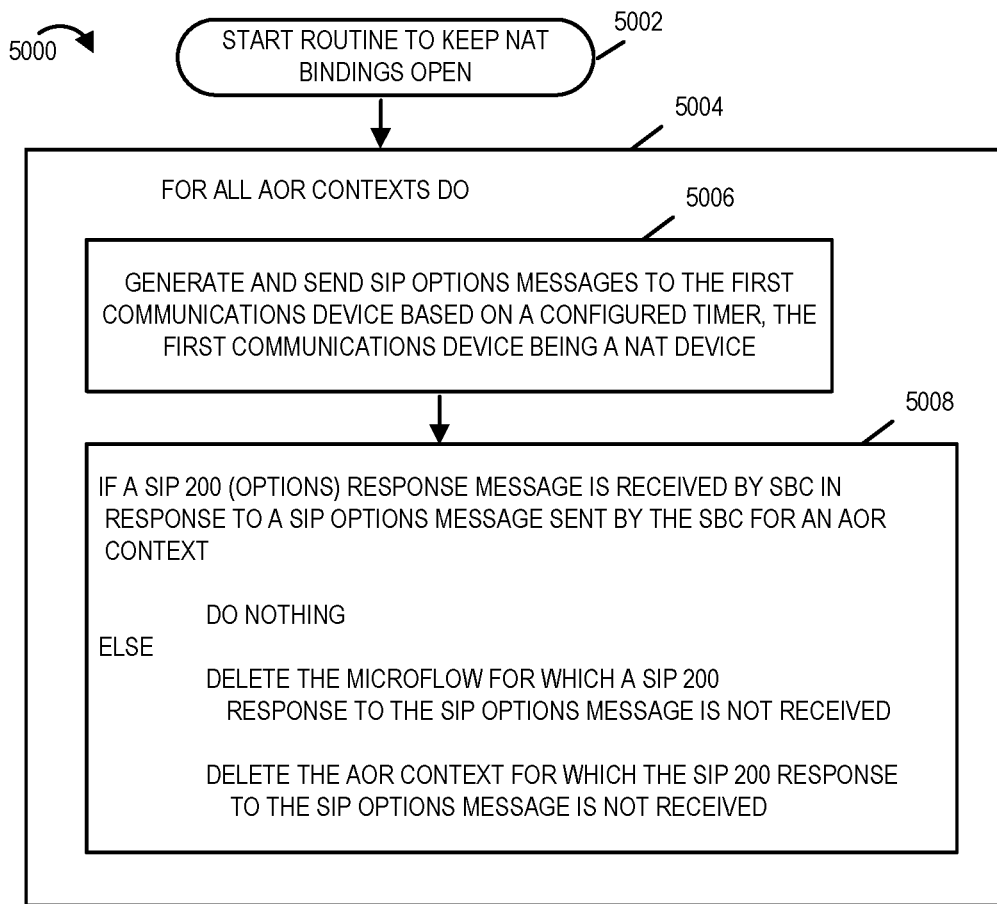
FIG. 13 illustrates an exemplary method of keeping Network Address Translation bindings opening in accordance with an embodiment of the present invention.

FIG. 13 illustrates an exemplary method/routine 5000 of keeping NAT bindings open in accordance with one embodiment of the present invention. When SIP INVITE message such as for example the first SIP INVITE request message discussed in connection with method 1000 are received at the SBC, the SBC determines if the SIP INVITE request message was received from a NAT device, e.g., based on the source IP address of the SIP INVITE request message. When the SBC has determined that it has received a SIP INVITE request messages from a NAT device, the SBC may, and in some embodiments calls the routine 5000 passing to it a list of AoR contexts with a source IP address corresponding to the NAT device. In the method 5000 it is assumed that all of the AoRs contexts correspond to the NAT device. The method 5000 is implemented by an SBC, e.g., SBC 106 from FIG. 1 or 2. The method 5000 commences in start step 5002. Operation proceeds from step 5002 to step 5004. Step 5004 includes a repeating DO LOOP. For all address of record contexts do steps 5006 and 5008 and keep repeating steps 5006 and 5008. This routine 5000 is run as a background task on the SBC.

In step 5006, the SBC is operated to generate and send SIP Options messages to the first communications device based on a configured timer, the first communication device being a NAT device. Operation proceeds from step 5006 to step 5008. In step 5008 when a SIP 200 response message is received by the SBC in response to a SIP OPTIONS message sent by the SBC for an AoR context, e.g., AoR-1 context corresponding to the first SIP INVITE request message then nothing is done and the NAT binding remains open but if a SIP 200 response message is not received in response to a SIP OPTIONS message sent by the SBC for an AoR context, e.g., AoR-1 context, then the SBC deletes the microflow for which a SIP 200 response to the SIP Options message is not received and deletes the AoR context record, e.g., AoR-1 context record, for which the SIP 200 response to the SIP Options message is not received. In some embodiments instead of sending SIP Options messages to keep the NAT bindings open the Internet Control Message Protocol (ICMP) pings may be used or alternatively Session Traversal Utilities for NAT (STUN) connectivity checks may be used.

LISTING OF NUMBERED EMBODIMENTS

Method Embodiment 1

A communications method, the method comprising: receiving, at a session border controller, a first SIP invite request message; making a decision, at the session border controller, as to whether the first SIP INVITE request message originated from a user device coupled to the session border controller via an Integrated Access Device or via an IP-PBX device; generating, at the SBC, a packet flow fillrate based on said decision as to whether the SIP invite request message originated from said user device coupled to the session border controller via the Integrated Access Device (IAD) or the Internet Protocol-Private Branch Exchange (IP-PBX) device.

Method Embodiment 2

The communications method of method embodiment 1 further comprising: implementing packet flow restrictions using the generated packet flow fillrate.

Method Embodiment 3

The method of method embodiment 2 wherein said step of generating a packet flow fillrate includes: generating an IP-PBX packet flow fillrate for the source Internet Protocol address included in the SIP INVITE request message when the decision is that the first SIP INVITE request message originated from the user device coupled to the session border controller via the IP-PBX device; generating an IAD packet flow fillrate for the source Internet Protocol address when the decision is that the first SIP INVITE request message originated from the user device coupled to the session border controller via the IAD device.

Method Embodiment 4

The method of method embodiment 1 further comprising: updating, at the session border controller, the generated packet flow fillrate on a periodic basis.

Method Embodiment 5

The method of method embodiment 1 further comprising: prior to making said decision determining from the first SIP INVITE request message the source IP address included in the first SIP INVITE request message, determining a total number of microflows with the determined source IP address currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source IP address currently active at the session border controller.

Method Embodiment 6

The method of method embodiment 5 wherein said step of making said decision further includes determining that said SIP INVITE request message originated from the user device coupled to the session border controller via the IP-PBX if said total number of microflows with the determined source IP address currently active at the session border controller is less than an Integrated Access Device threshold value.

Method Embodiment 7

The method of method embodiment 1 wherein the session border controller implements a token bucket policer with a fillrate of zero to implement packet flow restrictions of packets including a source Internet Protocol address and port number pair matching the source Internet Protocol address and port number pair included in said first SIP INVITE request message until said first SIP INVITE request message has been successfully authenticated.

Method Embodiment 8

The method of method embodiment 3 wherein said IAD packet flow fillrate is generated based on one or more of the following items: call admission control rate, an average number of messages per call, an average number of octets per call, a reserve factor, and a maximum number of Integrated Access Devices.

Method Embodiment 9

The method of method embodiment 8 wherein said IP-PBX packet flow fillrate is generated based on one or more of the following items: call admission control rate, an average number of messages per call, an average number of octets per call, a reserve factor and said total number of microflows having the source IP address.

Method Embodiment 10

The method of method embodiment 1 further comprising: prior to making said decision determining from the first SIP INVITE request message the source public IP subnet mask of the first communications device included in the first SIP INVITE request message, said first communications device being a Network Address Translation device, determining a total number of microflows with the determined source public IP subnet mask currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source public IP subnet mask currently active at the session border controller.

Apparatus Embodiment 11

A session border controller comprising: a processor that controls the session border control to perform the following operations: receive a first SIP invite request message; make a decision as to whether the first SIP INVITE request message originated from a user device coupled to the session border controller via an Integrated Access Device or via an IP-PBX device; generate a packet flow fillrate based on said decision as to whether the SIP invite request message originated from said user device coupled to the session border controller via the Integrated Access Device (IAD) or the Internet Protocol-Private Branch Exchange (IP-PBX) device.

Apparatus Embodiment 12

The session border controller of apparatus embodiment 11 wherein the processor is further controls the session border controller to implement packet flow restrictions using the generated packet flow fillrate.

Apparatus Embodiment 13

The session border controller of apparatus embodiment 12 wherein said generate a packet flow fillrate includes: generating an IP-PBX packet flow fillrate for the source Internet Protocol address included in the SIP INVITE request message when the decision is that the first SIP INVITE request message originated from the user device coupled to the session border controller via the IP-PBX device; generating an IAD packet flow fillrate for the source Internet Protocol address when the decision is that the first SIP INVITE request message originated from the user device coupled to the session border controller via the IAD device.

Apparatus Embodiment 14

The session border controller of apparatus embodiment 11 wherein said processor further controls the session border controller to update the generated packet flow fillrate on a periodic basis.

Apparatus Embodiment 15

The session border controller of apparatus embodiment 11 wherein said processor further controls the session border controller to: prior to making said decision determine from the first SIP INVITE request message the source IP address included in the first SIP INVITE request message, determine a total number of microflows with the determined source IP address currently active at the session border controller; and wherein said making a decision as to whether the SIP INVITE request message originated from the user device coupled to the session border controller via the Integrated Access Device or the IP-PBX device includes making said decision based on said total number of microflows with the determined source IP address currently active at the session border controller.

Apparatus Embodiment 16

The session border controller of apparatus embodiment 15 wherein said making said decision further includes determining that said SIP INVITE request message originated from the user device coupled to the session border controller via the IP-PBX if said total number of microflows with the determined source IP address currently active at the session border controller is less than an Integrated Access Device threshold value.

Apparatus Embodiment 17

The session border controller apparatus embodiment 11 wherein the session border controller implements a token bucket policer with a fillrate of zero to implement packet flow restrictions of packets including a source Internet Protocol address and port number pair matching the source Internet Protocol address and port number pair included in said first SIP INVITE request message until said first SIP INVITE request message has been successfully authenticated.

Apparatus Embodiment 18

The session border controller of apparatus embodiment 13 wherein said IAD packet flow fillrate is generated based on one or more of the following items: call admission control rate, an average number of messages per call, an average number of octets per call, a reserve factor, and a maximum number of Integrated Access Devices.

Apparatus Embodiment 19

The session border controller of apparatus embodiment 18 wherein said IP-PBX packet flow fillrate is generated based on one or more of the following items: call admission control rate, an average number of messages per call, an average number of octets per call, a reserve factor and said total number of microflows having the source IP address.

Apparatus Embodiment 20

The session border controller of apparatus embodiment 11 wherein said processor further controls the session border controller to: prior to making said decision determine from the first SIP INVITE request message the source public IP subnet mask of the first communications device included in the first SIP INVITE request message, said first communications device being a Network Address Translation device, determine a total number of microflows with the determined source public IP subnet mask currently active at the session border controller; and wherein said step of making a decision, at the session border controller, as to whether the SIP INVITE request message originated from the user device coupled to the session border controller via the Integrated Access Device or the IP-PBX device includes making said decision based on said total number of microflows with the determined source public IP subnet mask currently active at the session border controller.

The techniques of various embodiments may be implemented using software, hardware and/or a combination of software and hardware. Various embodiments are directed to apparatus such as for example a session border controller, NAT, IAD, IP-PBX, application server, user devices, telecommunications systems, network nodes and/or network equipment devices. Various embodiments are also directed to methods, e.g., method of controlling and/or operating devices such as call processing devices, session border controllers, NAT devices, Intergrated Access Device(s), IP-PBX systems, Application Server/Registrar, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a session border controller, a user device, a NAT device, an IAD, an IP-PBX, an application server, a registrar device including a processor configured to implement one, multiple or all of the steps of one or more methods of the invention.

In some embodiments, the processor or processors, e.g., CPUs, of one or more devices e.g., a session border controller, a user device, a NAT device, an IAD, an IP-PBX, an application server, a registrar device, are configured to perform the steps of the methods described as being performed by the device. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a call processing device, e.g., a session border controller, a user device, a NAT device, an IAD, an IP-PBX, an application server, a registrar device with a processor which includes a component corresponding to each of the steps of the various described methods performed by the device in which the processor is included. In some but not all embodiments a device, e.g., communications node such as a call processing device, a session border controller, a user device, a NAT device, an IAD, an IP-PBX, an application server, a registrar device, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the communications method comprising:

receiving, at a session border controller (SBC), a first Session Initiation Protocol (SIP) INVITE request message;

making a decision, at the session border controller, as to whether the first SIP INVITE request message originated from a user device coupled to the session border controller via an Integrated Access Device (IAD) or via an Internet Protocol-Private Branch Exchange (IP-PBX) device;

generating, at the session border controller, a packet flow fillrate based on said decision as to whether the first SIP INVITE request message originated from a user device coupled to the session border controller via an Integrated Access Device or via an Internet Protocol-Private Branch Exchange device; and implementing packet flow restrictions using the generated packet flow fillrate.

2. The method of claim 1 further comprising:

updating, at the session border controller, the generated packet flow fillrate on a periodic basis.

3. The communications method of claim 1 further comprising:
prior to making said decision:
(i) determining from the first SIP INVITE request message a source Internet Protocol (IP) address included in the first SIP INVITE request message; and
(ii) determining a total number of microflows with the determined source IP address which are currently active at the session border controller.

4. The communications method of claim 3, wherein said step of making a decision, at the session border controller, as to whether the first SIP INVITE request message originated from a user device coupled to the session border controller via an Integrated Access Device or via an IP-PBX device includes making said decision based on said total number of microflows with the determined source IP address which are currently active at the session border controller.

5. The communications method of claim 4, wherein said step of generating a packet flow fillrate includes:
generating an IP-PBX device packet flow fillrate for the determined source Internet Protocol address included in the first SIP INVITE request message when the decision is that the first SIP INVITE request message originated from a user device coupled to the session border controller via an IP-PBX device; and
generating an IAD packet flow fillrate for the determined source Internet Protocol address included in the first SIP INVITE request message when the decision is that the first SIP INVITE request message originated from a user device coupled to the session border controller via an Integrated Access Device.

6. The communications method of claim 5, wherein said step of making said decision further includes determining that said first SIP INVITE request message originated from a user device coupled to the session border controller via an IP-PBX device if said total number of microflows with the determined source IP address which are currently active at the session border controller is less than an Integrated Access Device threshold value.

7. The communications method of claim 5, wherein said step of making said decision further includes determining that said first SIP INVITE request message originated from a user device coupled to the session border controller via an IAD if said total number of microflows with the determined source IP address which are currently active at the session border controller is greater than or equal to an Integrated Access Device threshold value.

8. The communications method of claim 5, wherein said IAD packet flow fillrate is generated based on one or more of the following items: call admission control rate, an average number of messages per call, an average number of octets per call, a reserve factor, and a maximum number of Integrated Access Devices.

9. The communications method of claim 5, wherein said IP-PBX packet flow fillrate is generated based on one or more of the following items: call admission control rate, an average number of messages per call, an average number of octets per call, a reserve factor and said total number of microflows having the source IP address.

10. The method of claim 1 further comprising:
prior to making said decision:
(i) determining from the first SIP INVITE request message a source public IP subnet mask of a first communications device included in the first SIP INVITE request message, said first communications device being a Network Address Translation device via which the first SIP INVITE request message is received at the session border controller, and
(ii) determining a total number of microflows with the determined source public IP subnet mask which are currently active at the session border controller; and
wherein said step of making a decision, at the session border controller, as to whether the first SIP INVITE request message originated from a user device coupled to the session border controller via an Integrated Access Device or via an IP-PBX device includes making said decision based on said total number of microflows with the determined source public IP subnet mask which are currently active at the session border controller.

11. The communications method of claim 3,
wherein said first SIP INVITE request message is directed to a SIP Application server or a SIP registrar located behind said session border controller; and
wherein said implementing packet flow restrictions using the generated packet flow fillrate protects the SIP Application server or the SIP registrar from denial of service attacks.

12. A session border controller (SBC) comprising:
a processor that controls the session border controller to perform the following operations:
receive a first Session Initiation Protocol (SIP) INVITE request message;
make a decision as to whether the first SIP INVITE request message originated from a user device coupled to the session border controller via an Integrated Access Device (IAD) or via an Internet Protocol-Private Branch Exchange (IP-PBX) device;
generate a packet flow fillrate based on said decision as to whether the first SIP INVITE request message originated from a user device coupled to the session border controller via an Integrated Access Device or via an Internet Protocol-Private Branch Exchange device; and
implement packet flow restrictions using the generated packet flow fillrate.

13. The session border controller of claim 12, wherein said processor further controls the session border controller to:
prior to making said decision:
determine from the first SIP INVITE request message a source IP address included in the first SIP INVITE request message; and
determine a total number of microflows with the determined source IP address which are currently active at the session border controller.

14. The session border controller of claim 13, wherein said making a decision as to whether the first SIP INVITE request message originated from a user device coupled to the session border controller via an Integrated Access Device or via an IP-PBX device includes making said decision based on said total number of microflows with the determined source IP address which are currently active at the session border controller.

15. The session border controller of claim 14, wherein said generate a packet flow fillrate includes:
generating an IP-PBX packet flow fillrate for the source Internet Protocol address included in the first SIP INVITE request message when the decision is that the first SIP INVITE request message originated from a user device coupled to the session border controller via an IP-PBX device; and
generating an IAD packet flow fillrate for the source Internet Protocol address when the decision is that the first SIP INVITE request message originated from a user device coupled to the session border controller via an Integrated Access Device.

16. The session border controller of claim 15, wherein said making said decision further includes determining that said first SIP INVITE request message originated from a user device coupled to the session border controller via an IP-PBX device if said total number of microflows with the determined source IP address which are currently active at the session border controller is less than an Integrated Access Device threshold value.

17. The session border controller of claim 15, wherein said making said decision further includes determining that said first SIP INVITE request message originated from a user device coupled to the session border controller via an Integrated Access Device if said total number of microflows with the determined source IP address which are currently active at the session border controller is greater than or equal to an Integrated Access Device threshold value.

18. The session border controller of claim 15, wherein said IAD packet flow fillrate is generated based on one or more of the following items: call admission control rate, an average number of messages per call, an average number of octets per call, a reserve factor, and a maximum number of Integrated Access Devices.

19. The session border controller of claim 15, wherein said IP-PBX packet flow fillrate is generated based on one or more of the following items: call admission control rate, an average number of messages per call, an average number of octets per call, a reserve factor and said total number of microflows having the source IP address.

20. A non-transitory computer readable medium including processor executable instructions which when executed by a processor included in a session border controller control the session border controller to perform the following operations:

receive a first Session Initiation Protocol (SIP) INVITE request message;

make a decision as to whether the first SIP INVITE request message originated from a user device coupled to the session border controller via an Integrated Access Device (IAD) or via an Internet Protocol-Private Branch Exchange (IP-PBX) device;

generate a packet flow fillrate based on said decision as to whether the first SIP INVITE request message originated from a user device coupled to the session border controller via an Integrated Access Device or via an Internet Protocol-Private Branch Exchange device; and implement packet flow restrictions using the generated packet flow fillrate.

* * * * *